US007865833B2

(12) United States Patent
Takaku et al.

(10) Patent No.: US 7,865,833 B2
(45) Date of Patent: Jan. 4, 2011

(54) DATA PROCESSING APPARATUS, DATA PROCESSING SERVER, DATA PROCESSING SYSTEM, METHOD OF CONTROLLING DATA PROCESSING APPARATUS, METHOD OF CONTROLLING DATA PROCESSING SERVER, COMPUTER PROGRAM, AND COMPUTER READABLE STORAGE MEDIUM

(75) Inventors: Masahiko Takaku, Kanagawa (JP); Hajime Oshima, Tokyo (JP); Tomomi Fukuoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 917 days.

(21) Appl. No.: 10/326,100

(22) Filed: Dec. 23, 2002

(65) Prior Publication Data

US 2003/0122862 A1 Jul. 3, 2003

(30) Foreign Application Priority Data

Dec. 28, 2001 (JP) ............................. 2001-401348
Dec. 28, 2001 (JP) ............................. 2001-401349

(51) Int. Cl.
*G06F 17/00* (2006.01)
*G06F 3/00* (2006.01)
*G06F 9/00* (2006.01)

(52) U.S. Cl. ...................... 715/723; 715/788; 715/764; 715/762; 715/760; 715/733

(58) Field of Classification Search ................ 715/500, 715/716, 723, 704, 522, 517, 501.1, 500.1, 715/733, 760, 762, 764, 788

See application file for complete search history.

(56) References Cited

U.S. PATENT DOCUMENTS

| 5,124,912 | A   | * | 6/1992  | Hotaling et al.   | 705/9   |
|-----------|-----|---|---------|-------------------|---------|
| 6,253,216 | B1  | * | 6/2001  | Sutcliffe et al.  | 715/205 |
| 6,525,801 | B1  | * | 2/2003  | Matsuzawa et al.  | 352/40  |
| 2001/0027454 | A1 | * | 10/2001 | Tsue            | 707/102 |
| 2002/0015059 | A1 | * | 2/2002  | Clarke           | 345/744 |

FOREIGN PATENT DOCUMENTS

JP 10006608 1/1998
JP 3208116 9/2001

* cited by examiner

*Primary Examiner*—Boris Pesin
*Assistant Examiner*—Sabrina L Greene
(74) *Attorney, Agent, or Firm*—Fitzpatrick, Cella, Harper & Scinto

(57) ABSTRACT

This invention provides a data processing apparatus, data processing server, and data processing system, which can easily edit data by utilizing features of object-based coding, and can easily generate object-based encoded multimedia data. A multimedia edit & playback terminal (201) issues an edit instruction of multimedia data to a multimedia edit server (202) that edits multimedia data consisting of a plurality of object data. A communication client (214) receives layout information of multimedia data. A playback unit (212) displays the acquired layout information, and an edit designation unit (211) designates desired one of the displayed layout information. The designated layout information is output via the communication client (214).

3 Claims, 16 Drawing Sheets

FIG. 7

SCENE (701)

```
...
Transform2D {
translation 300 37
children [
Shape {
geometry Bitmap {}
appearance Appearance {
material Material {}
texture DEF syanaihoucm
Movie Texture {
starttime -1
url "%PALACE_HOLDER%"
}
}
}
]
}
...
```

INFORMATION ASSOCIATED WITH SCENE (702)

```
...
<Object Descriptor ID="3">
  <Es Descriptor ES_ID="3">
    <Data Info>
      URL="%PALACE_HOLDER%"
      Format="video" Attr="10"/>
    <Decoder Config
      Stream Type="0x04" OTI="0x20"/>
    <SL Config AU Start FIg="true"
      AU End FIg="true">
      <OCR ES_ID="7"/>
    </SL Config>
  </Es Descriptor>
</Object Descriptor>
...
```

FIG. 15

| COMMAND | PROCESSING LOCATION | PROCESSING CONDITION |
|---------|---------------------|----------------------|
| Trim | entry1 * | (null) |
| Oilpaint | http://... | depth>3 |
| Oilpaint | entry2 * | depth<=3 |

1501 — COMMAND
1502 — PROCESSING LOCATION
1503 — PROCESSING CONDITION

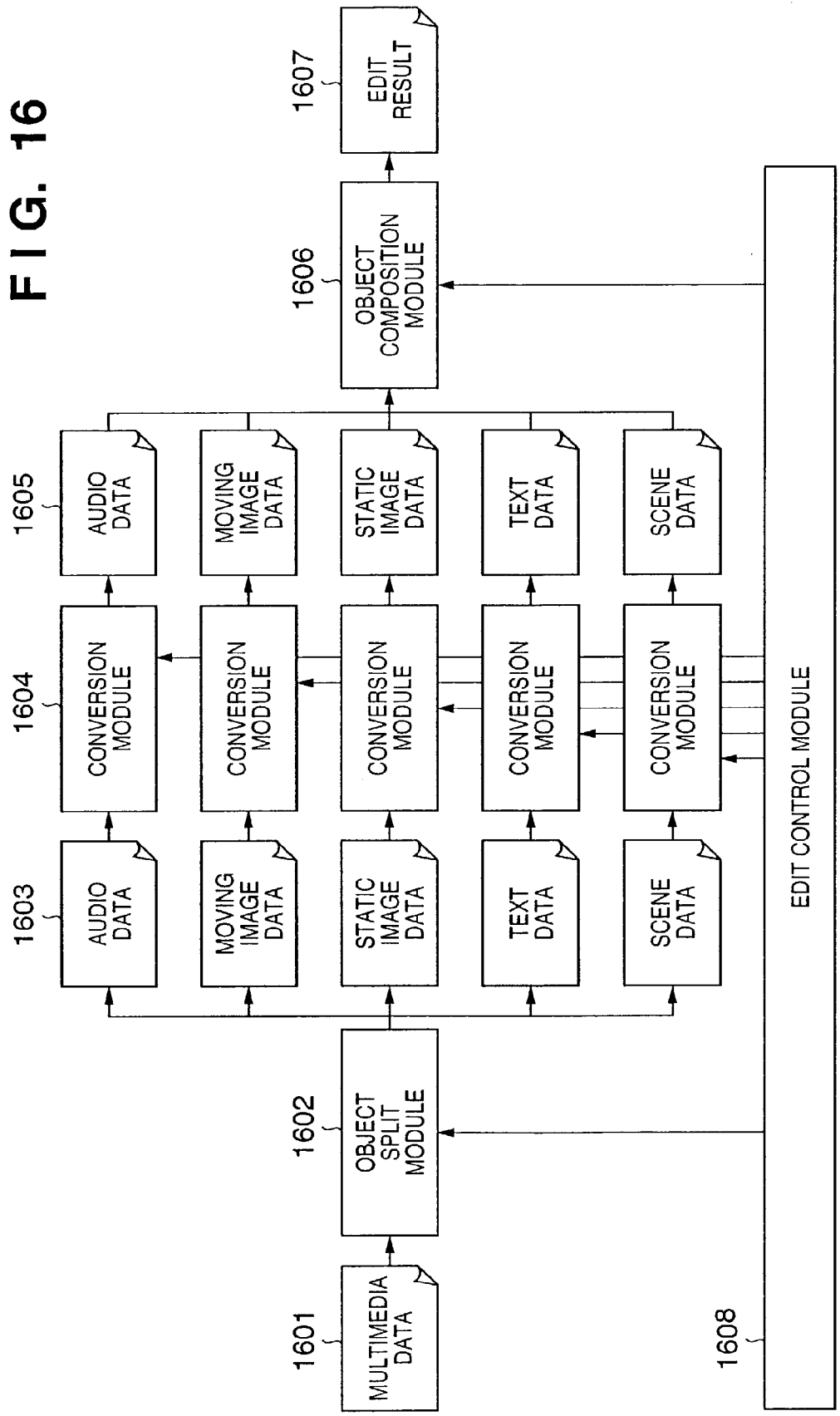

DATA PROCESSING APPARATUS, DATA PROCESSING SERVER, DATA PROCESSING SYSTEM, METHOD OF CONTROLLING DATA PROCESSING APPARATUS, METHOD OF CONTROLLING DATA PROCESSING SERVER, COMPUTER PROGRAM, AND COMPUTER READABLE STORAGE MEDIUM

FIELD OF THE INVENTION

The present invention relates to a data processing apparatus, a data processing server, a data processing system, a method of controlling a data processing apparatus, a method of controlling a data processing server, a computer program, and a computer readable storage medium, which are used to edit multimedia data which have been multimedia-encoded by MPEG-4 (Moving Picture Expert Group Phase 4) coding, multimedia coding having an object description function, and the like.

BACKGROUND OF THE INVENTION

In recent years, as digital data broadcast and digital video have prevailed, end users can handle multimedia data with ease. Also, prevalence of mobile communication devices such as portable phones, and the like allows the user to easily make wireless communications at a place where he or she visited, and an environment that allows network connections is in order. Hence, as a result of easy accessibility to multimedia data, mobile communication device such as a so-called third-generation portable phone and the like, which can handle multimedia data, have appeared.

However, a conventional portable terminal device does not always have sufficient processor performance and storage area to attain size and weight reductions. Hence, in order to process multimedia data, it is a common practice to, e.g., drop the resolution of an image or the frame rate (the number of frames per unit time) of a moving image.

Yet, a conventional portable terminal device does not perform any processes that fully utilize features of multimedia data to be handled. For this reason, in a portable terminal device as a typical compact, lightweight mobile communication device, various devices are made to attain size and weight reductions and to process multimedia data within its limited data processing performance and memory or within a limited bandwidth upon communications, so as to utilize its features. As one of such devices, low-bitrate, high-compression multimedia coding such as MPEG-4 may be used.

Object-based coding such as MPEG-4 can form one multimedia data by a plurality of objects. To these objects, data of various formats such as a moving image, static image, computer graphics (or vector graphics), text, audio, and the like can be applied. These objects can be held together with layout information of a tree structure.

However, the current specifications associated with multimedia data have very complicated format, and it is difficult to edit multimedia data under many restrictions.

Conventionally, upon editing such complicated multimedia data, it is a common practice to ask a third party, who saves and edit data in a personal computer or the like, which has less restrictions, or possesses a dedicated data edit machine, to do the actual job. Hence, services that execute an edit process by a server with a data edit function on the Internet and return the edit result to a client are provided, and techniques associated with such services have been studied.

At the present time, a simple multimedia e-mail service that composites a static image, sent to a server on the Internet, with a photo frame, music, message, or the like to generate composite data, and returns a URL (Uniform Resource Locators, RFC1738) indicating that processing result has been made available. That is, user's edit operations are made on another machine with sufficient processing performance, which is connected via a communication line or the like, due to limitations on the processing performance of the terminal device.

As described above, the process for making a server on the Internet edit data, and returning the processing result can composite a static image or a simple rectangular moving image by HTML (HyperText Markup Language). However, a process that edits multimedia data which has been encoded by object-based coding, and allows the user to acquire the edit result as object-based encoded data is not available.

On the other hand, the current specifications associated with multimedia data have very complicated format, and it is difficult to edit multimedia data under many restrictions. In this manner, since it is hard to edit multimedia data on a portable terminal with limited processing performance, the user must carry out a procedure for saving multimedia data on a personal computer as an apparatus having higher performance than the portable terminal, saving the edit result on the portable terminal again, and playing it back.

Conventionally, upon editing such complicated multimedia data, it is a common practice to ask a third party, who saves and edit data in a personal computer or the like, which has less restrictions, or possesses a dedicated data edit machine, to do the job. Based on this, services that execute an edit process by a server with a data edit function on the Internet and return the edit result to a client are provided, and techniques associated with such services have been proposed.

For example, according to Japanese Patent No. 3208116, a method of generating indices for audio and moving image data, and searching for a scene using such indices has been proposed. With this method, a location to be edited can be specified without playing back multimedia data.

Also, according to Japanese Patent Laid-Open No. 10-6608, a method that combines macro and micro searches and allows the user to conduct an easy moving image search has been proposed. In order to solve the aforementioned problems, this technique allows to easily search for a moving image saved in a WWW server, and to edit on the server side by designating edit conditions such as edit start and edit instructions from a WWW browser.

However, when every data edit processes are executed by a personal computer or the like which has less restrictions, another problem, i.e., a long data communication time, is posed. On the other hand, even a terminal device such as a portable terminal which has very limited processor performance and storage area can execute simple processes such as a process for extracting a part of a moving image.

SUMMARY OF THE INVENTION

The present invention has been proposed to solve the conventional problems, and has as its object to provide a data processing apparatus, data processing server, and data processing system, which allow even a portable terminal with limited processing performance to easily edit data by utilizing features of object-based coding, and to easily generate object-based encoded multimedia data by connecting a server which can edit multimedia data and issuing edit instructions to that server.

In order to achieve the above object, a data processing apparatus according to the present invention is directed to a data processing apparatus which can be connected, via a network, to a data processing server that edits multimedia data consisting of predetermined object data, comprising reception means for receiving templates of edit processes for the multimedia data from the data processing server, designation means for designating one of the templates received by the reception means, and transmission means for transmitting information indicating the template designated by the designation means and the multimedia data to the data processing server so as to execute a desired edit process for the multimedia data.

A data processing apparatus according to the present invention is directed to a data processing apparatus which can be connected, via a network, to a data processing server that generates multimedia data consisting of predetermined object data, comprising reception means for receiving templates of edit processes for the multimedia data from the data processing server, designation means for designating one of the templates received by the reception means, and transmission means for transmitting information indicating the template designated by the designation means and predetermined object data to the data processing server so as to generate desired multimedia data.

A data processing server according to the present invention is directed to a data processing server which can be connected, via a network, to a data processing apparatus that generates multimedia data consisting of predetermined object data, comprising reception means for receiving multimedia data, and information indicating a template of an edit process for the multimedia data from the data processing apparatus, split means for splitting the multimedia data received by the reception means into object data that form the multimedia data, and edit means for generating new multimedia data using the object data split by the split means, and the information indicating the template of the edit process received by the reception means.

A data processing server according to the present invention is directed to a data processing server which can be connected, via a network, to a data processing apparatus that generates predetermined object data, comprising reception means for receiving predetermined object data, and information indicating a template of an edit process, which generates desired multimedia data using the predetermined object data, from the data processing apparatus, and edit means for generating multimedia data using the object data and the information indicating the template of the edit process received by the reception means.

A method of controlling a data processing apparatus according to the present invention is directed to a method of controlling a data processing apparatus which can be connected, via a network, to a data processing server that edits multimedia data consisting of predetermined object data, comprising the reception step of receiving templates of edit processes for the multimedia data from the data processing server, the designation step of designating one of the templates received in the reception step, and the transmission step of transmitting information indicating the template designated in the designation step and the multimedia data to the data processing server so as to execute a desired edit process for the multimedia data.

A method of controlling a data processing apparatus according to the present invention is directed to a method of controlling a data processing apparatus which can be connected, via a network, to a data processing server that generates multimedia data consisting of predetermined object data, comprising the reception step of receiving templates of edit processes for the multimedia data from the data processing server, the designation step of designating one of the templates received in the reception step, and the transmission step of transmitting information indicating the template designated in the designation step and predetermined object data to the data processing server so as to generate desired multimedia data.

A method of controlling a data processing server according to the present invention is directed to a method of controlling a data processing server which can be connected, via a network, to a data processing apparatus that generates multimedia data consisting of predetermined object data, comprising the reception step of receiving multimedia data, and information indicating a template of an edit process for the multimedia data from the data processing apparatus, the split step of splitting the multimedia data received in the reception step into object data that form the multimedia data, and the edit step of generating new multimedia data using the object data split in the split step, and the information indicating the template of the edit process received in the reception step.

A method of controlling a data processing server according to the present invention is directed to a method of controlling a data processing server which can be connected, via a network, to a data processing apparatus that generates predetermined object data, comprising the reception step of receiving predetermined object data, and information indicating a template of an edit process, which generates desired multimedia data using the predetermined object data, from the data processing apparatus, and the edit step of generating multimedia data using the object data and the information indicating the template of the edit process received in the reception step.

A computer program according to the present invention is directed to a computer program for controlling a data processing apparatus which can be connected, via a network, to a data processing server that edits multimedia data consisting of predetermined object data, comprising a code of the reception step of receiving templates of edit processes for the multimedia data from the data processing server, a code of the designation step of designating one of the templates received in the reception step, and a code of the transmission step of transmitting information indicating the template designated in the designation step and the multimedia data to the data processing server so as to execute a desired edit process for the multimedia data.

A computer program according to the present invention is directed to a computer program for controlling a data processing apparatus which can be connected, via a network, to a data processing server that generates multimedia data consisting of predetermined object data, comprising a code of the reception step of receiving templates of edit processes for the multimedia data from the data processing server, a code of the designation step of designating one of the templates received in the reception step, and a code of the transmission step of transmitting information indicating the template designated in the designation step and predetermined object data to the data processing server so as to generate desired multimedia data.

A computer program according to the present invention is directed to a computer program for controlling a data processing server which can be connected, via a network, to a data processing apparatus that generates multimedia data consisting of predetermined object data, comprising a code of the reception step of receiving multimedia data, and information indicating a template of an edit process for the multimedia data from the data processing apparatus, a code of the split step of splitting the multimedia data received in the reception step into object data that form the multimedia data, and a code of the edit step of generating new multimedia data using the object data split in the split step, and the information indicating the template of the edit process received in the reception step.

A computer program according to the present invention is directed to a computer program for controlling a data processing server which can be connected, via a network, to a data processing apparatus that generates predetermined object data, comprising a code of the reception step of receiving predetermined object data, and information indicating a template of an edit process, which generates desired multimedia data using the predetermined object data, from the data processing apparatus, and a code of the edit step of generating multimedia data using the object data and the information indicating the template of the edit process received in the reception step.

It is another object of the present invention to provide a data processing apparatus, a data processing server, a data processing system, a method of controlling a data processing apparatus, a method of controlling a data processing server, a computer program, and a computer readable storage medium, which can implement efficient edit processes for respective multimedia data objects by executing an edit process that can be processed by a terminal device on the terminal device side, and executing an edit process, which is hardly executed by the terminal device side due to limited CPU performance, memory size, battery, and the like of the terminal device, on the server side having higher performance.

In order to achieve the above object, a data processing apparatus according to the present invention is directed to a data processing apparatus which can be connected, via a network, to a data processing server that edits multimedia data consisting of predetermined object data, comprising input means for inputting multimedia data, edit process designation means for designating an edit process for the multimedia data, judgment means for judging an apparatus that executes the edit process designated by the edit process designation means, and transmission means for transmitting the multimedia data to the data processing server so as to apply the designated edit process to the multimedia data in accordance with an output from the judgment means.

A data processing server according to the present invention is directed to a data processing server which can be connected to the aforementioned data processing apparatus via a network, comprising input means for inputting predetermined multimedia data, and an edit instruction of the multimedia data from the data processing apparatus, and edit means for editing the multimedia data on the basis of the edit instruction.

A method of controlling a data processing apparatus according to the present invention is directed to a method of controlling a data processing apparatus which can be connected, via a network, to a data processing server that edits multimedia data consisting of predetermined object data, comprising the input step of inputting multimedia data, the edit process designation step of designating an edit process for the multimedia data, the judgment step of judging an apparatus that executes the edit process designated in the edit process designation step, and the transmission step of transmitting the multimedia data to the data processing server so as to apply the designated edit process to the multimedia data in accordance with a judgment result of the judgment step.

A method of controlling a data processing server according to the present invention is directed to a method of controlling a data processing server which can be connected to the aforementioned data processing apparatus via a network, comprising the input step of inputting predetermined multimedia data, and an edit instruction of the multimedia data from the data processing apparatus, and the edit step of editing the multimedia data on the basis of the edit instruction.

A computer program according to the present invention is directed to a computer program for controlling a data processing apparatus which can be connected, via a network, to a data processing server that edits multimedia data consisting of predetermined object data, comprising a code of the input step of inputting multimedia data, a code of the edit process designation step of designating an edit process for the multimedia data, a code of the judgment step of judging an apparatus that executes the edit process designated in the edit process designation step, and a code of the transmission step of transmitting the multimedia data to the data processing server so as to apply the designated edit process to the multimedia data in accordance with a judgment result of the judgment step.

A computer readable storage medium according to the present invention stores the computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example wherein a description of a scene expressed in VRML is partially extracted;

FIG. 15 shows a practical example of a processing condition table; and

FIG. 16 is a block diagram of a program that edits object-based encoded multimedia data.

DETAILED DESCRIPTION OF THE PREFERRED EMBODIMENTS

Preferred embodiments of the present invention will now be described in detail in accordance with the accompanying drawings.

Prior to a description of the preferred embodiments of the present invention, an explanation that pertains to object-based coding will be given first. Object-based coding such as MPEG-4 can form one multimedia data by a plurality of objects. To these objects, data of various formats such as a moving image, static image, computer graphics (or vector graphics), text, audio, and the like can be applied. The multimedia data holds information associated with a combination among these objects as layout information (to be referred to as "scene" hereinafter) of a tree structure.

Figure 1:
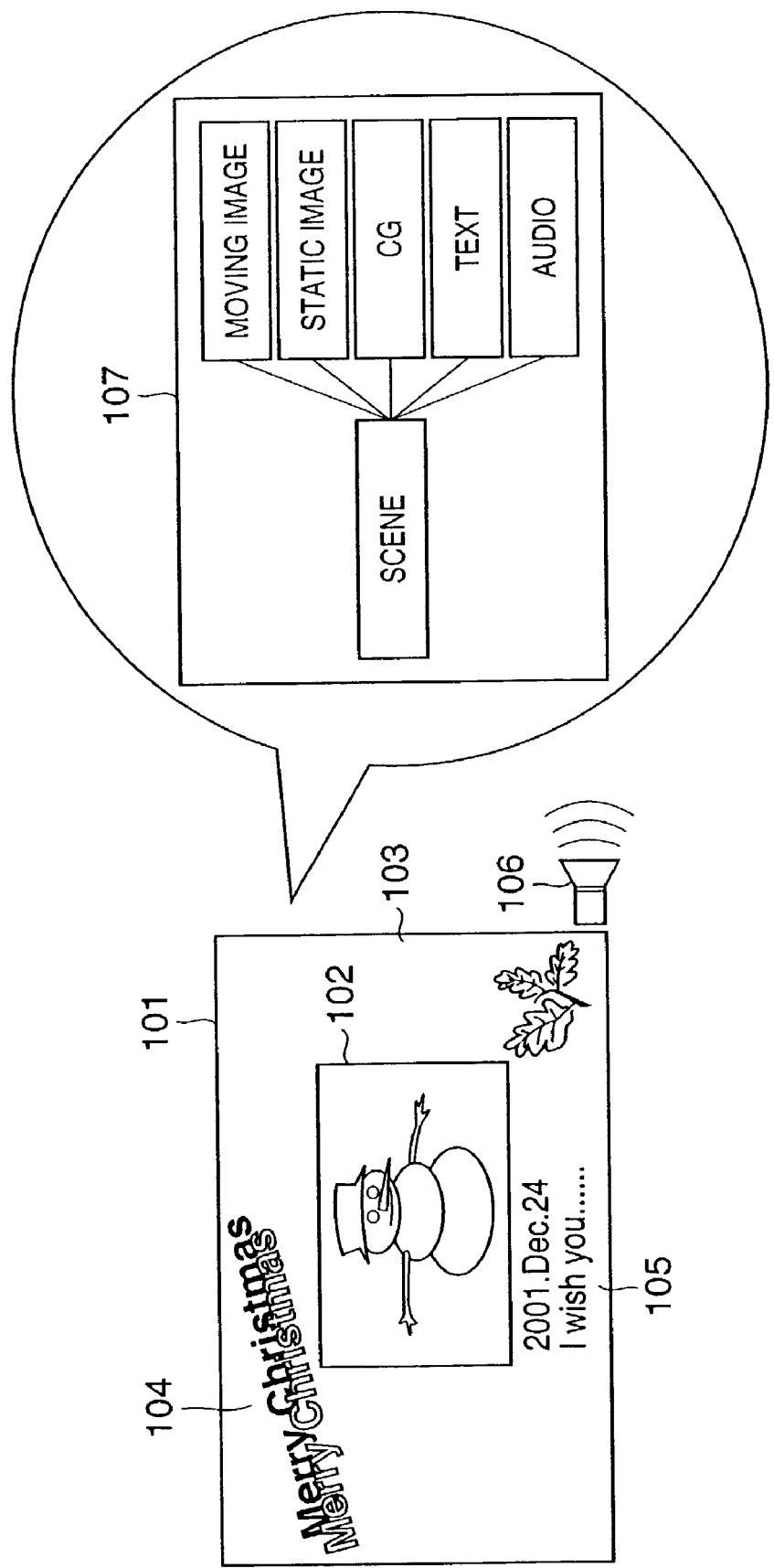
FIG. 1 is a schematic view for explaining object-based encoded multimedia data.

FIG. 1 is a schematic view for explaining object-based encoded multimedia data. As shown in FIG. 1, multimedia data 101 is configured by a plurality of objects such as a moving image 102, static image 103 as a background, computer graphics 104 described by vector graphics, text 105 as a character string used to convey messages, audio 106, and the like, and a scene 107 that gives information used to composite these objects. Note that the configuration of multimedia data is not limited to that shown in FIG. 1. For example, text 105 may be omitted, and other types of objects, which are not shown in FIG. 1, may be added.

In this manner, in object-based coding, respective objects themselves are independently present, and these objects are stored in one or more files or the like. For example, all objects are stored in a single file together in one system, or objects are stored in different formats using given units, and are played back together as if they were a single file in another system.

For example, in MPEG-4, a file format called MP4 is standardized as one of such storage methods (ISO/IEC 14496-1/2000.1 "MPEG-4 $3^{rd}$ Edition" 13. File Format). In the following description, as for the storage method of objects, assume that all objects are stored in a single file, for the sake of simplicity.

Upon editing object-based encoded multimedia data, as shown in FIG. 1, not only a function of editing each individual object itself, but also a function of editing the scene 107 that gives layout of individual objects must be taken into consideration.

Handling of object-based encoded multimedia data is complicated compared to that of conventional data that solely gives a moving image or static image. Therefore, editing the scene 107 also edits the positions of individual objects and their synchronization, and it may be difficult to attain such process depending on the processing performance of a terminal. Generation of multimedia data requires higher processing performance than playback of multimedia data.

<First Embodiment>

An embodiment that utilizes features of object-based coding, and easily edits multimedia data using a multimedia edit server which is independent from a terminal that plays back multimedia data, will be described first.

Figure 2:
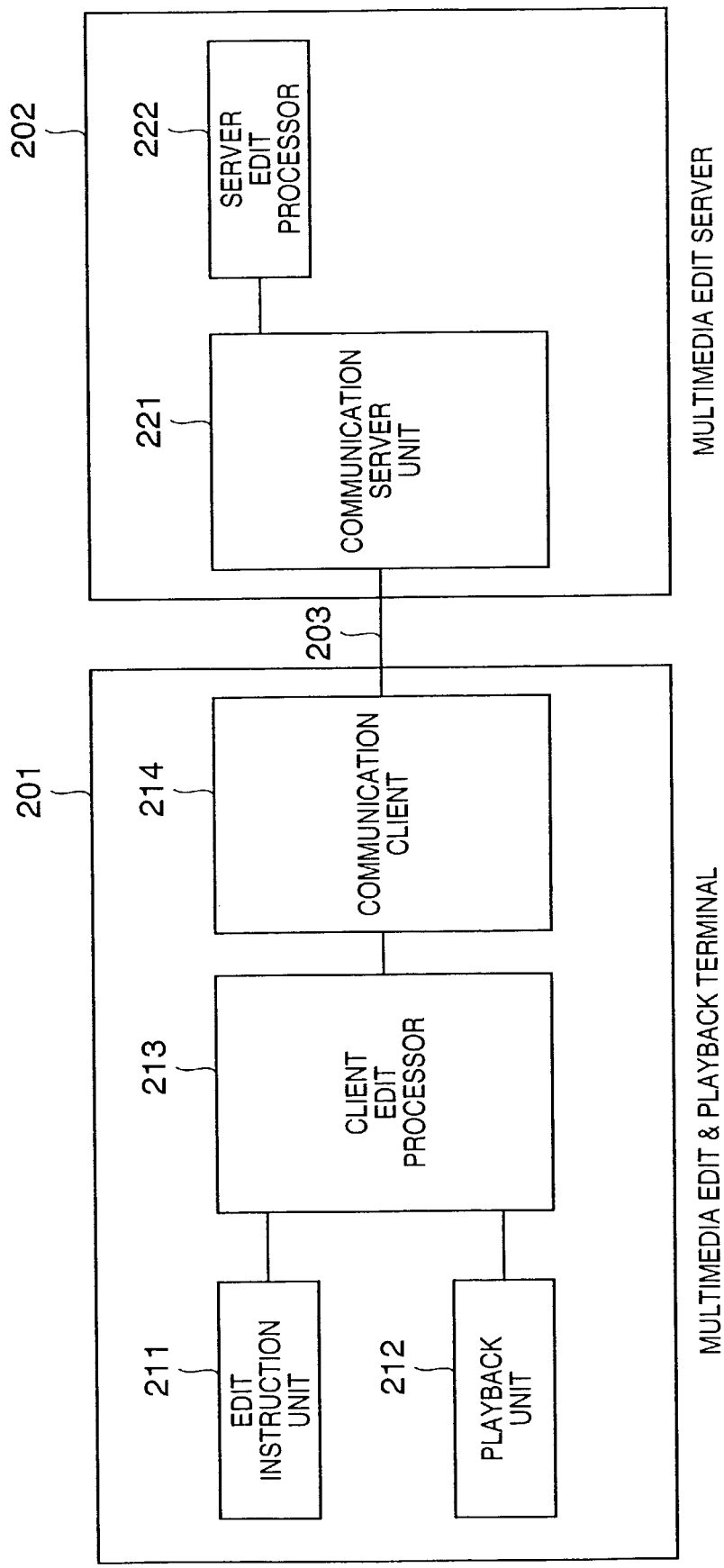
FIG. 2 is a block diagram for explaining the arrangement of a multimedia edit system for editing multimedia data according to the first embodiment of the present invention.

FIG. 2 is a block diagram for explaining the arrangement of a multimedia edit system for editing multimedia data according to the first embodiment of the present invention. As shown in FIG. 2, the multimedia edit system in this embodiment comprises a multimedia edit & playback terminal 201 corresponding to a portable terminal which has some restrictions in performance, a multimedia edit server 202 serving as a main body for making complicated edit processes, and a network 203 such as the Internet or the like, which connect the terminal and server.

The multimedia edit & playback terminal 201 comprises an edit instruction unit 211 for issuing instructions for an edit process and the like, a playback unit 212 for playing back and displaying intermediate and final results of the edit process, a client edit processor 213 for making a simple edit process, and a communication client 214 for making various data communications with the multimedia edit server 202. On the other hand, the multimedia edit server 202 comprises a communication server unit 221 for receiving data such as edit instructions and the like, and a server edit processor 222 for executing an edit process of multimedia data.

In the multimedia edit & playback terminal 201, the edit instruction unit 211 comprises, e.g., a GUI (Graphical User Interface) or the like, and has a function of accepting user's operations and issuing edit operation instructions; it executes general processes except for a function associated with playback of multimedia data in this embodiment.

The playback unit 212 plays back multimedia data; a device which has a function of decoding and displaying multimedia data. The client edit processor 213 is connected to the edit instruction unit and playback unit 212, and provides simple edit functions, i.e., various data edit functions within the processable range of the multimedia edit & playback terminal 201.

Furthermore, the communication client 214 is connected to the client edit processor, and is used to execute communication processes. That is, the communication client 214 has a function of sending various operations associated with edit operations instructed from the edit instruction unit 211 to the multimedia edit server 202 via the network 203. Also, the communication client 214 has a function of receiving multimedia data from the multimedia edit server 202 and supplying it to the playback unit 212 that presents the final and intermediate results of the edit process done by the multimedia edit server 202 in a user recognizable form.

On the other hand, in the multimedia edit server 202, the communication server 221 is connected to the network 203, and implements a communication processing function on the multimedia edit server 202 corresponding to the communication client 214 in the multimedia edit & playback terminal 201. The edit unit 222 executes an edit process of multimedia data on the basis of instructions from the edit instruction unit 211 of the multimedia edit & playback terminal 201.

Note that the network 203 can adopt various communication environments such as a wireless communication system represented by a communication environment based on PDC (Personal Digital Cellular), GSM (Global System for Mobile Communications), CDMA (Code Division Multiple Access) or the like, a wireless LAN (Local Area Network), a wired LAN represented by Ethernet, and the like.

Figure 3:
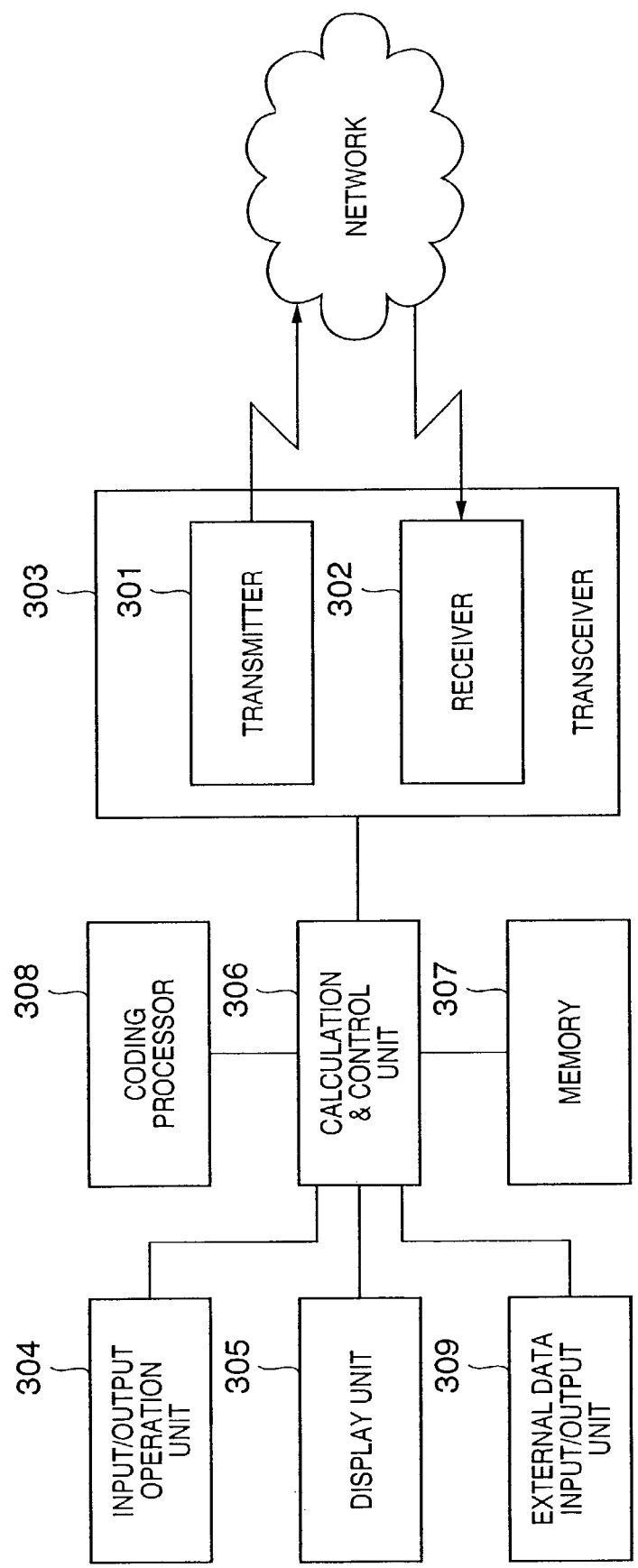
FIG. 3 is a schematic block diagram showing the electrical arrangement of a multimedia edit & playback terminal 201.

The electrical arrangements of the multimedia edit & playback terminal 201 and multimedia edit server 202 will be described below. FIG. 3 is a schematic block diagram showing the electrical arrangement of the multimedia edit & playback terminal 201. As shown in FIG. 3, the multimedia edit & playback terminal 201 comprises a transmitter 301 and receiver 302 or a transceiver 303 as a combination of them, an input/output operation unit 304, a display unit 305, a calculation & control unit 306, a memory unit 307, a coding processor 308, and an external data input/output unit 309.

The transmitter 301 and receiver 302 or the transceiver 303 as a combination of them provides communication means for communicating with a mobile communication station when the multimedia edit & playback terminal 201 is, e.g., a mobile communication device. Or the transmitter 301 and receiver 302 or the transceiver 303 provides communication means such as IP protocol or the like when the multimedia edit & playback terminal 201 is connected via, e.g., a LAN or the like.

Information to be exchanged by the transmitter 301 and receiver 302 or the transceiver 303 as a combination of them includes, e.g., multimedia data themselves, their information processing requests such as a send instruction, edit instruction, and the like, and so forth.

The input/output operation unit 304 is a pointing device, keypad, or the like, which is operated by the user. The input/output operation unit 304 may include a lamp or loudspeaker, which is used to inform an operation state. That is, the input/output operation unit 304 provides practical operation means and other device operation functions of a multimedia edit process to the user.

The display unit 305 provides a display function represented by an LCD (Liquid Crystal Display), and the user can view the operation contents and the playback result of multimedia data via this unit. Upon playing back multimedia data, audio data such as music, speech, and the like are often simultaneously expressed. In this case, an expression function of such data is represented by the display unit 305 for the sake of simplicity.

The calculation & control unit 306 comprises a microprocessor, clock, bus controller, and the like, and controls the overall multimedia edit & playback terminal 201. The control of the overall multimedia edit & playback terminal 201 includes, e.g., transfer of display data to the display unit 305, control of a refresh instruction, and the like.

The memory unit 307 is a storage medium for storing multimedia data, a basic program used to control the multimedia edit & playback terminal 201, an application program that provides edit functions, and the like. As the memory unit 307, an internal storage area assured on a semiconductor memory, a storage medium represented by a magnetic disk, and the like may be used. A portable terminal or the like normally uses a nonvolatile semiconductor memory or the like, and various kinds of storage media mentioned above may be combined.

The memory unit 307 may comprise a semiconductor disk or the like such as an IC card, which can be detachable from the internal memory of the device. When the memory unit 307 comprises a semiconductor disk such as a detachable IC card, data are input/output via the external data input/output unit 309 to be described later.

The coding processor 308 executes a coding or an decoding process and the like of multimedia data, e.g., a compression/decompression process for coding/decoding multimedia data. With a function associated with this compression/decompression process, for example, if the multimedia edit & playback terminal 201 has a camera function, photographed information can be stored in the memory unit 307 via the coding processor 308. The external data input/output unit 309 is used to input/output data to/from an external storage medium such as a semiconductor disk, magnetic disk, magnetooptical disk, or the like.

Figure 4:
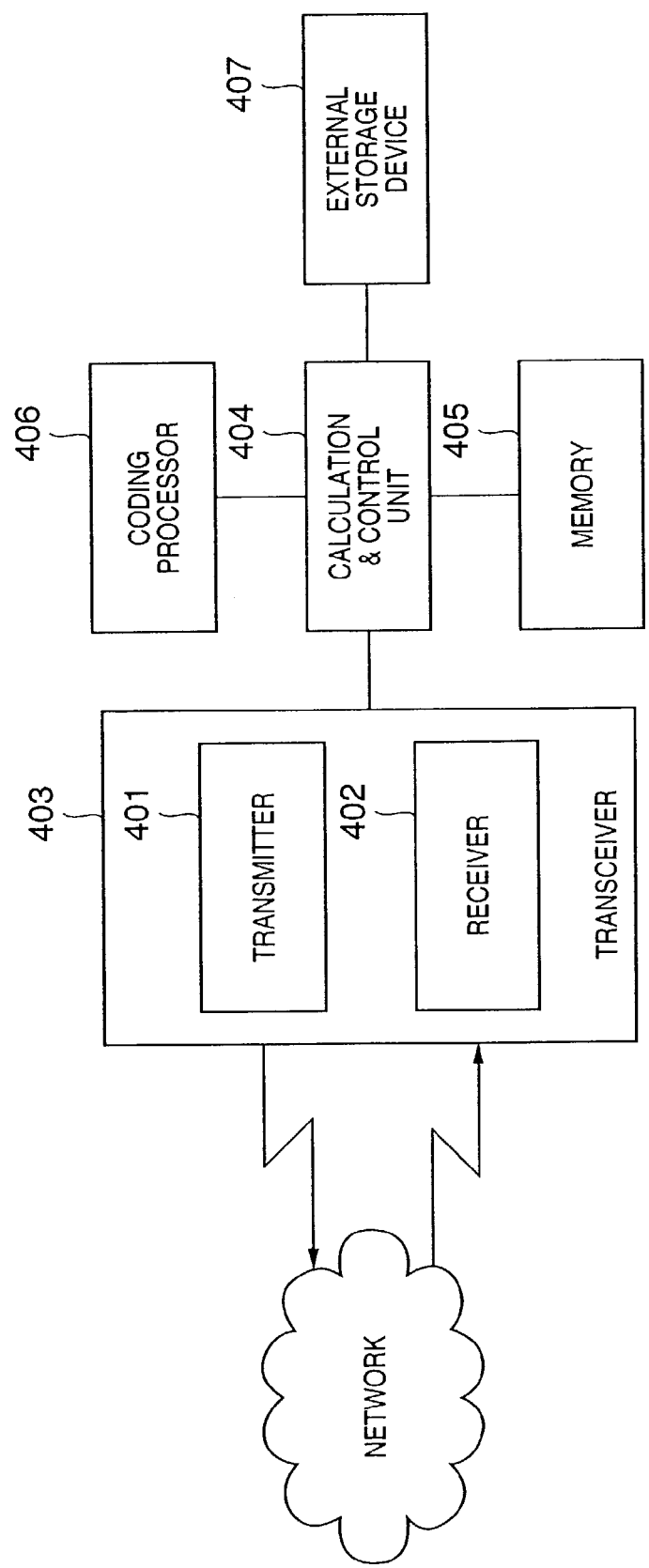
FIG. 4 is a schematic block diagram showing the electrical arrangement of a multimedia edit server 202.

FIG. 4 is a schematic block diagram showing the electrical arrangement of the multimedia edit server 202. As shown in FIG. 4, the multimedia edit server 202 comprises a transmitter 401 and receiver 402 or a transceiver 403 as a combination of them, a calculation & control unit 404, a memory unit 405, a coding processor 406, and an external storage device 407. This arrangement is basically similar to that of the multimedia edit & playback terminal 201, except that an input/output operation unit and display unit need not always be equipped. However, the input/output operation unit and display unit may be equipped for the purpose of maintenance of the device or the like.

The transmitter 401 and receiver 402 or the transceiver 403 as a combination of them provides communication means with the multimedia edit & playback terminal 201. For example, when the network 203 is the Internet, and the multimedia edit & playback terminal 201 is connected via an ISP (Internet Service Provider), the transmitter 401 and receiver 402 or the transceiver 403 corresponds to an Ethernet connection device connected to the backbone of the Internet.

The calculation & control unit 404, memory unit 405, and external storage device 407 respectively correspond to the calculation & control unit 306, memory unit 307, and external data input/output unit 309 in the multimedia edit & playback terminal 201, and are substantially equivalent to those of an information processing apparatus such as a general computer or the like.

The coding processor 406 executes a coding or an decoding process and the like of multimedia data, and has, e.g., a compression/decompression function of coding/decoding multimedia data in some cases. Also, the coding processor 406 may have a calculation processing function required upon editing multimedia data. The coding processor 308 shown in FIG. 3 and the coding processor 406 shown in FIG. 4 execute the coding or the decoding process and the like of multimedia data.

Multimedia data processing often requires huge resources of an information processing apparatus, and a dedicated encoding processor is used for such purpose. However, as the processing performance of a calculation & control unit has improved in recent years, the calculation & control unit can process multimedia data. For this reason, in the present invention, the coding processors 308 and 406 may not be indispensable building components.

The multimedia edit server 202 may be constituted by a plurality of apparatuses in place of a single apparatus for the purpose of distributing the load. Note that parallel processors are included in this scope.

The arrangements of the multimedia edit & playback terminal 201 and multimedia edit server 202 have been explained. The edit instruction unit 211, playback unit 212, client edit processor 213, communication client 214, communication server unit 221, and server edit processor 222 in the block diagram of FIG. 2 that shows the logical arrangement correspond to logical operations upon actually executing the processing operation according to the present invention.

For example, when the edit instruction unit 211 executes an edit instruction process, data is input from the external data input/output unit 309, the calculation & control unit 306 executes a process in response to an input from the input/output operation unit 304, and the display unit 305 displays the operation contents.

The processing sequence upon editing multimedia data using the multimedia edit system which comprises the multimedia edit & playback terminal 201 and multimedia edit server 202 in this embodiment described above will be described below.

Figure 5:
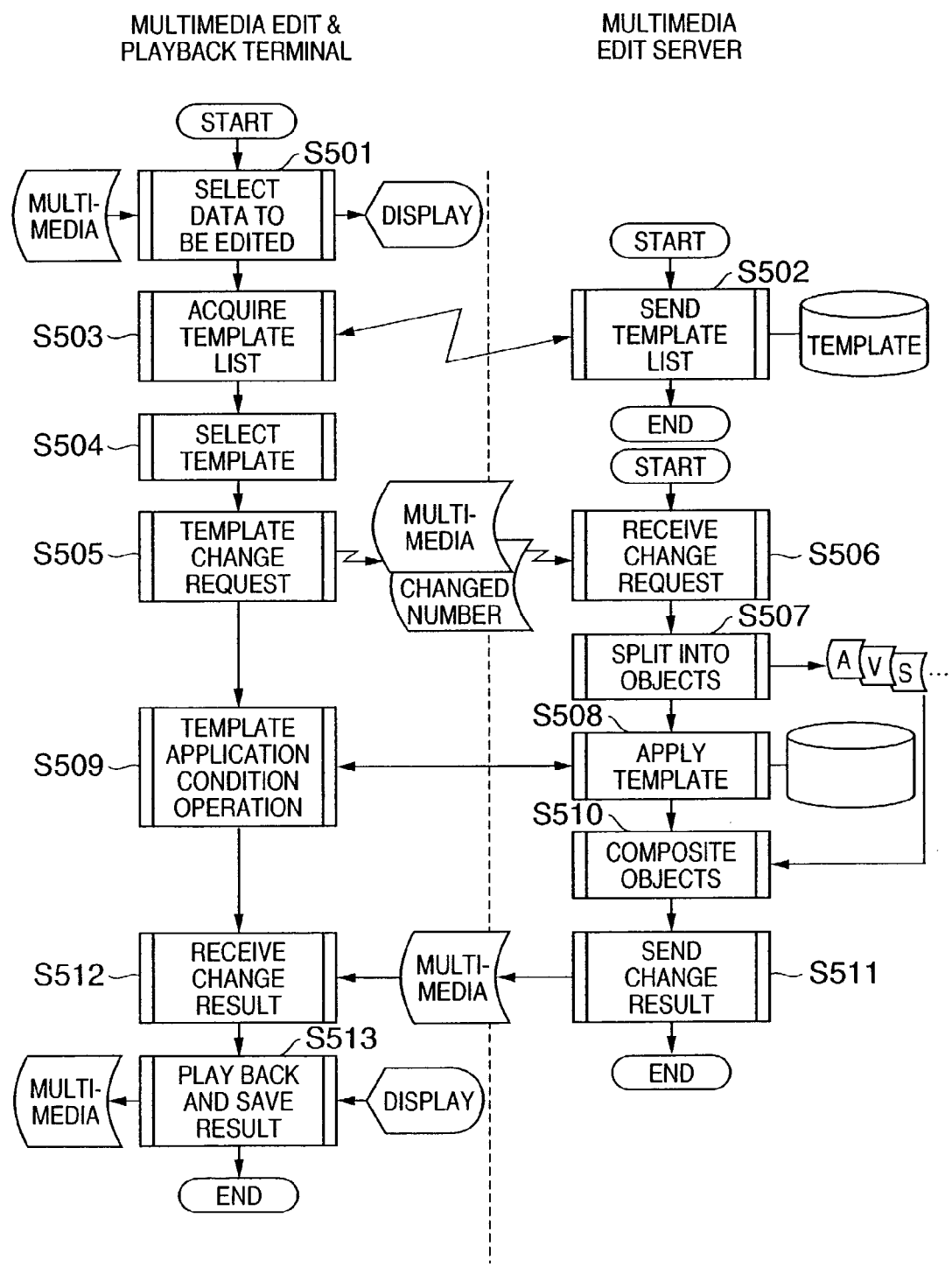
FIG. 5 is a flow chart for explaining the processing sequence of the overall multimedia edit system according to the first embodiment.

FIG. 5 is a flow chart for explaining the processing sequence of the overall multimedia edit system according to this embodiment. Initially, the user of this system that edits multimedia data selects multimedia data to be edited using the multimedia edit & playback terminal 201 (step S501). Assume that data indicated by multimedia data 101 shown in FIG. 1 is selected at the multimedia edit & playback terminal 201 at that time.

After the multimedia edit server 202 connected via the network 203 confirms access from the multimedia edit & playback terminal 201, it reads a list of templates, which are used upon data edit and allow the user to picture the edit result, from a database or the like of the external storage device 407 or the like, and outputs it to the multimedia edit & playback terminal 201 (step S502). The multimedia edit & playback terminal 201 acquires information associated with the output list of templates (step S503).

Note that a template means configuration information of multimedia data, which contains a scene that indicates the positions and the like of individual objects which form multimedia data, an object such as pre-set computer graphics or the like, and so forth.

The user selects a desired template such as a template which is approximate to the layout of multimedia data that the user wants to edit from the acquired list of templates (step S504). After the template has been selected, the multimedia edit & playback terminal 201 sends the multimedia data to be edited selected in step S501 and information that uniquely specifies the selected template to the multimedia edit server 202 (step S505).

Note that the information that uniquely specifies a template may use a template ID formed by an arbitrary character string or the like, a URL (Uniform Resource Locators, RFC1738), or the like.

The multimedia edit server 202 receives the multimedia data and the information that uniquely specifies the selected template (step S506). The multimedia edit server 202 starts an edit process of the multimedia data using the template.

In the edit process, the received multimedia data is split into objects (step S507). This process utilizes a split function called an object splitter, and splits the multimedia data into various objects such as a moving image, static image, computer graphics (or vector graphics), text, audio, scene, and the like.

In object-based coding, data is split into individual objects in place of their types. That is, if one multimedia data contains three moving image data, the data is split into three moving image objects.

The split objects can be applied to an object configuration described in the template selected in step S504. Then, an application process for compositing the object configuration of the selected template and the split objects is executed (step S508).

Note that the object configuration set as the template does not always match that of the multimedia data to be edited. For this reason, in the template application process in step S508, a template application state operation process that includes user's operations at the multimedia edit & playback terminal 201 may be executed (step S509).

The objects and template are composited and new multimedia data is edited (step S510). The new multimedia data as the edit result is returned to the multimedia edit & playback terminal 201 (step S511).

The multimedia edit & playback terminal 201 receives the new multimedia data returned from the multimedia edit server 202 (step S512), and can play back and save that data (step S513).

Figure 6:
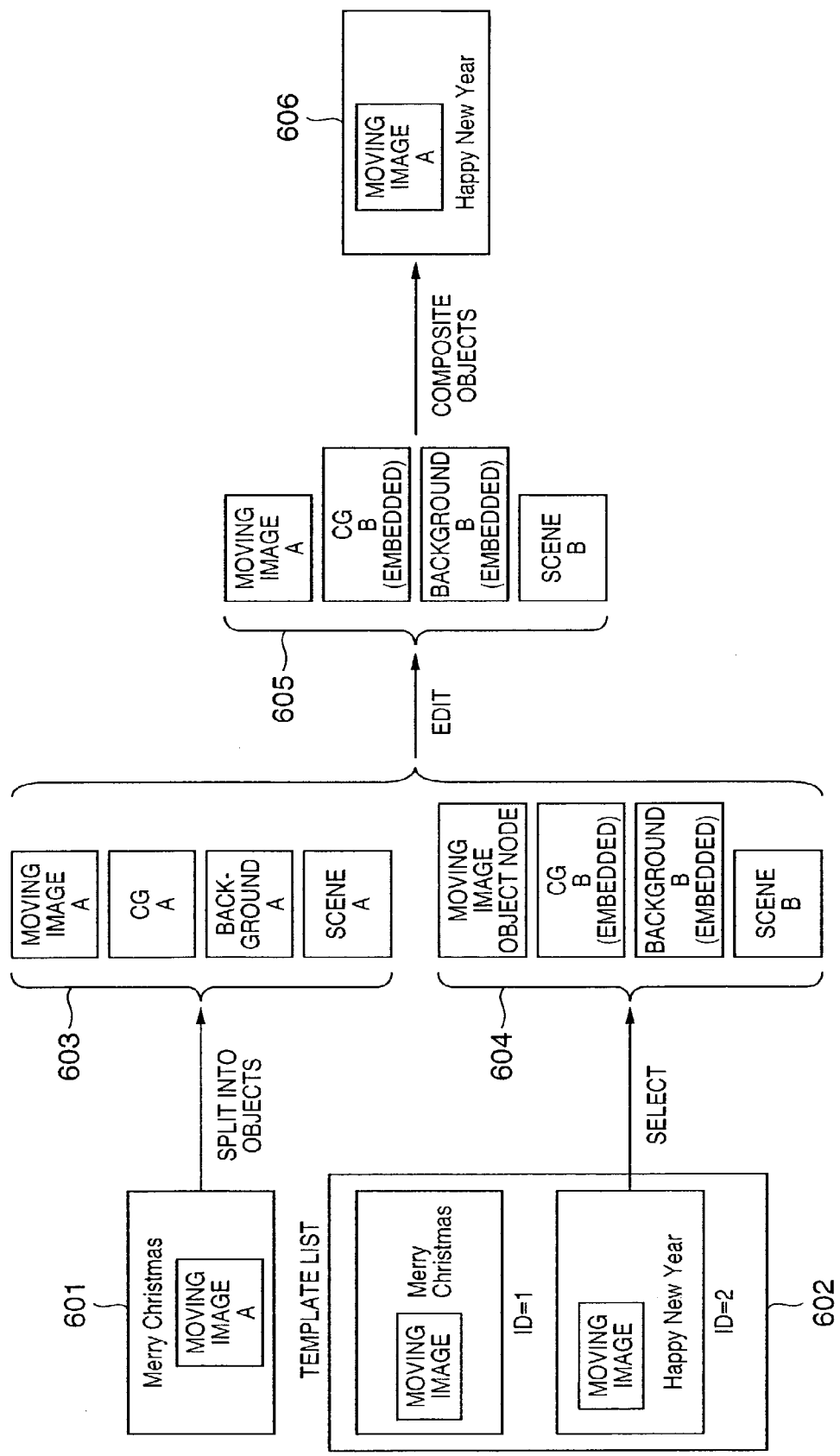
FIG. 6 depicts the edit process of multimedia data edited in the processing sequence shown in FIG. 5.

FIG. 6 depicts the edit process of the multimedia data to be edited in the processing sequence in FIG. 5. As shown in FIG. 6, multimedia data 601 to be edited is selected in advance in step S501. Then, a template list 602 indicating the edit contents is selected, and is acquired by the multimedia edit & playback terminal 201 in step S503. In the example shown in FIG. 6, two templates (ID=1, ID=2) are displayed as a list.

In the example shown in FIG. 6, the data configurations of the multimedia data 601 and data in the template list 602 are simple. When the multimedia data is split into objects, an object group 603 consists of moving image A, computer graphics A, background static image A, and scene A indicating their configuration. On the other hand, an object group 604 which forms the selected template (ID=2 in this case) consists of an object node that contains a moving image, computer graphics B, background static image B, and scene B indicating their configuration. Note that the object node means the original location of each object, and no object is actually present at that location in the object group 604.

In an edit result 605 obtained by editing these objects, this object node is replaced by the object of moving image A contained in the multimedia data 601 to be edited. In a composite result 606 after object composition, objects other than that of moving image A contained in the multimedia data 601 to be edited are replaced by those of the selected template.

The application process (step S508) for compositing the object configuration of the selected template and the split objects, and the composition process (step S510) of the object group and template in the flow chart of FIG. 5 will be described in more detail below.

In general, when object-based coding is based on MPEG-4, a scene uses a language called VRML (Virtual Reality Modeling Language). As a scene of object-based coding, XML (extensible Markup Language), HTML (HyperText Markup Language), SMIL (Synchronized Multimedia Integration Language), MHEG (Multimedia and Hypermedia information coding Experts Group), and the like may be used. Furthermore, digital broadcast uses BML (Broadcast Markup Language), and various languages may be used to describe a scene.

Since it is difficult to describe about all these languages in reference to this embodiment, a case will be explained below wherein object-based coding is done based on MPEG-4, VRML is used as scene information, and object information is internally defined by a structure description language such as XML or the like.

When multimedia data to be edited is described by MPEG-4, each individual object data is linked to a scene via a value called ES_ID. For example, objects are linked in such a manner that ES_ID=1 is a moving image, ES_ID=2 is a first static image, ES_ID=3 is a second static image, ES_ID=4 is scene information itself, and so forth.

In the standard, each individual object is linked to a descriptor called OD (Object Descriptor), and the type of each object is set by a value called StreamType (ISO/IEC 14496-1).

In this manner, when multimedia data to be edited is described by MPEG-4, the types of objects and the link positions of objects in a scene can be detected with reference to the aforementioned information upon splitting the multimedia data into objects. For example, moving image A in the example in FIG. 6 is described to have ES_ID=3 and StreamType=4.

On the other hand, in a template, a scene is described in VRML, and information associated with that scene is described in a structure description language. These pieces of information may be described as a single file, or may be present as data on different memories. FIG. 7 shows an example wherein a description of a scene expressed in VRML is partially extracted.

A scene 701 partially describes a scene described in VRML, and %PLACE_HOLDER% describes a reference to an object to be actually embedded. Information 702 associated with the scene describes information of a scene expressed in XML, and %PLACE_HOLDER% similarly describes a reference to an object to be actually embedded. As described within Decoder Config tags, "4" is set in Stream-Type, meaning the type of this object is 4.

Therefore, by cross-reference via this StreamType, how to set an object contained in multimedia data to be edited with respect to an object node present in a template can be determined.

Note that matching of the object types and the number of objects between individual objects in multimedia data to be edited, and object nodes contained in the template must be taken into consideration. For example, if the number of object nodes which are contained in the template and to which objects can be applied is larger than that in the edit source, an object may be omitted in the object composition process. In an opposite case, not all objects can be applied to the template. For this reason, in the template application state operation process (step S509) that includes user's operations in the edit processing sequence shown in FIG. 5, an interactive process for solving the aforementioned problem may be executed.

The order of processes executed between the multimedia edit & playback terminal 201 operated by the user, and the multimedia edit server 202 will be explained below. In the processing sequence shown in FIG. 5, the order of step S501 of selecting multimedia data to be edited, and step S503 of acquiring template list information may be arbitrarily determined, and their order may be reversed to that in the above embodiment. Even when a template is selected from the template list information, and multimedia data to be edited is then selected, these processes are independent from each other, and do not influence each other.

Also, after multimedia data to be edited is output to the multimedia edit server 202 and is split into objects, a template may be selected. In such order of processes, since multimedia data has already been split into objects before selection of a template, only templates that match the number of objects of the multimedia data to be edited can be presented to the user.

As described above, since the multimedia edit server 202 stores templates of object-based encoded multimedia data, and multimedia data to be edited is sent to the multimedia edit server 202 and undergoes an edit process, object-based encoded data can be easily edited. Since an edit process based on a scene is executed in place of encoding individual objects, a subsidiary effect can be obtained, i.e., the processing contents (e.g., encoding of a moving image) that impose heavy processing load can be reduced as much as possible.

<Second Embodiment>

An embodiment that utilizes features of object-based coding, and simply edits multimedia data using a multimedia edit server which is independent from a terminal that plays back and edits multimedia data, will be described below.

The first embodiment has explained a case wherein the already generated object-based encoded multimedia data is selected and edited. Also, the present invention can be applied to a case wherein multimedia data is generated from individual objects.

Figure 8:
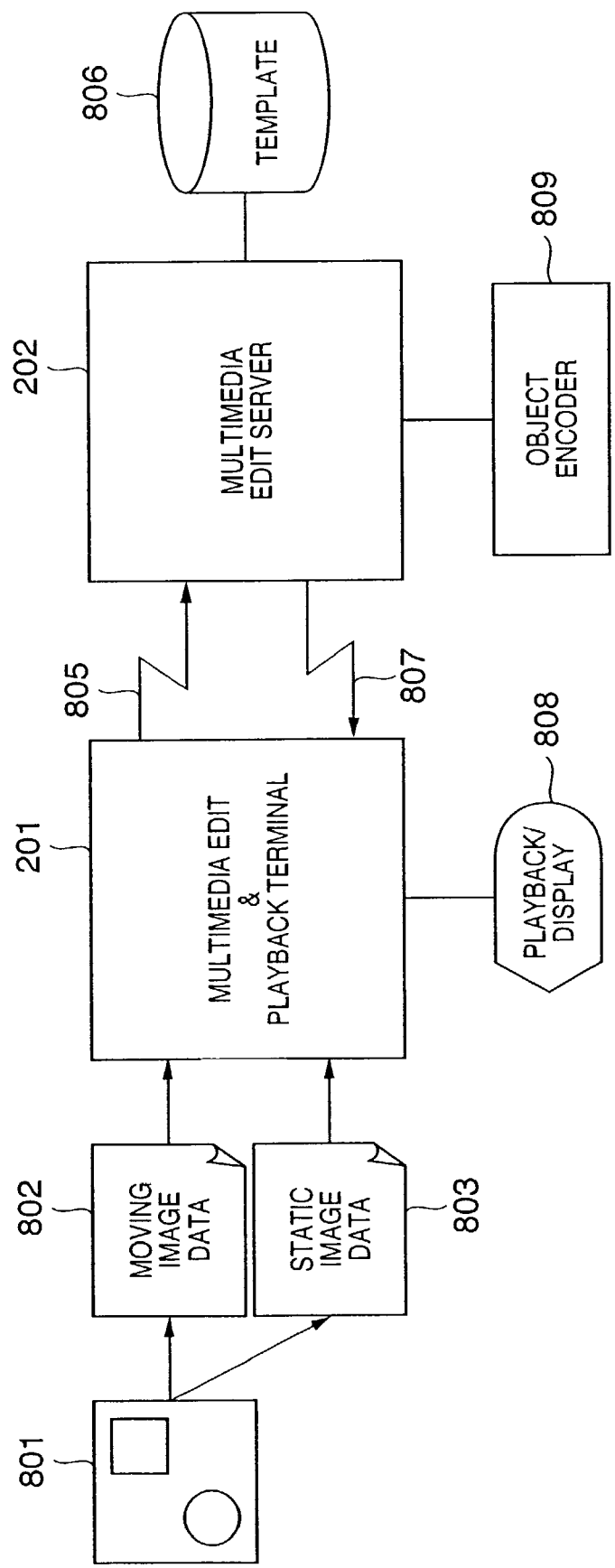
FIG. 8 is a schematic diagram showing the arrangement of a multimedia edit system according to the second embodiment.

FIG. 8 is a schematic diagram showing the arrangement of a multimedia edit system according to the second embodiment. Referring to FIG. 8, a photographing terminal 801 is a photographing device such as a digital still camera, video camera, or the like, and can output a photographed scene and the like as digital moving image data 802 and digital static image data 803. The moving image data 802 and static image data 803 output from the photographing terminal 801 are easily input to the multimedia edit & playback terminal 201.

However, if input digital data is each individual object that does not contain any scene, the edit process of the already generated object-based encoded multimedia data described in the first embodiment cannot be applied. Instead, the multimedia edit & playback terminal 201 can output the moving image data 802 and static image data 803 as individual objects to the multimedia edit server 202.

The digital data which are sent to the multimedia edit server 202 are equivalent to objects obtained upon completion of the process (step S507) for splitting multimedia data into objects in the flow chart shown in FIG. 5.

If the data sent (805) from the multimedia edit & playback terminal 201 can be used as objects that match a template 806, data edited via object composition is sent (807) to the multimedia edit & playback terminal 201, thus generating object-based encoded multimedia data. The multimedia data generated in this way can be played back and displayed (808), and so-called rich multimedia data can be generated by a simple method by selecting a template.

Object formats in the process for generating multimedia data from individual objects will be additionally explained. An object encoder 809 is connected to the multimedia edit server 202 in the multimedia edit system shown in FIG. 8. This object encoder 809 is included as one building component of the multimedia edit server 202.

The object encoder 809 is a module for shaping each individual object sent from the multimedia edit & playback terminal 201 to the multimedia edit server 202 to a format suitable for object-based coding.

For example, assume that object-based coding of data to be generated is MPEG-4. If the format of object sent from the multimedia edit & playback terminal 201 is Motion-JPEG which is not handled in MPEG-4, a Motion-JPEG object must be encoded to a format that MPEG-4 can handle. In such case, the object encoder 809 is used. The object encoder 809 decodes, e.g., Motion-JPEG data into bitmap data, and encodes the bitmap data as an input into MPEG-4 moving image object data.

Figure 9:
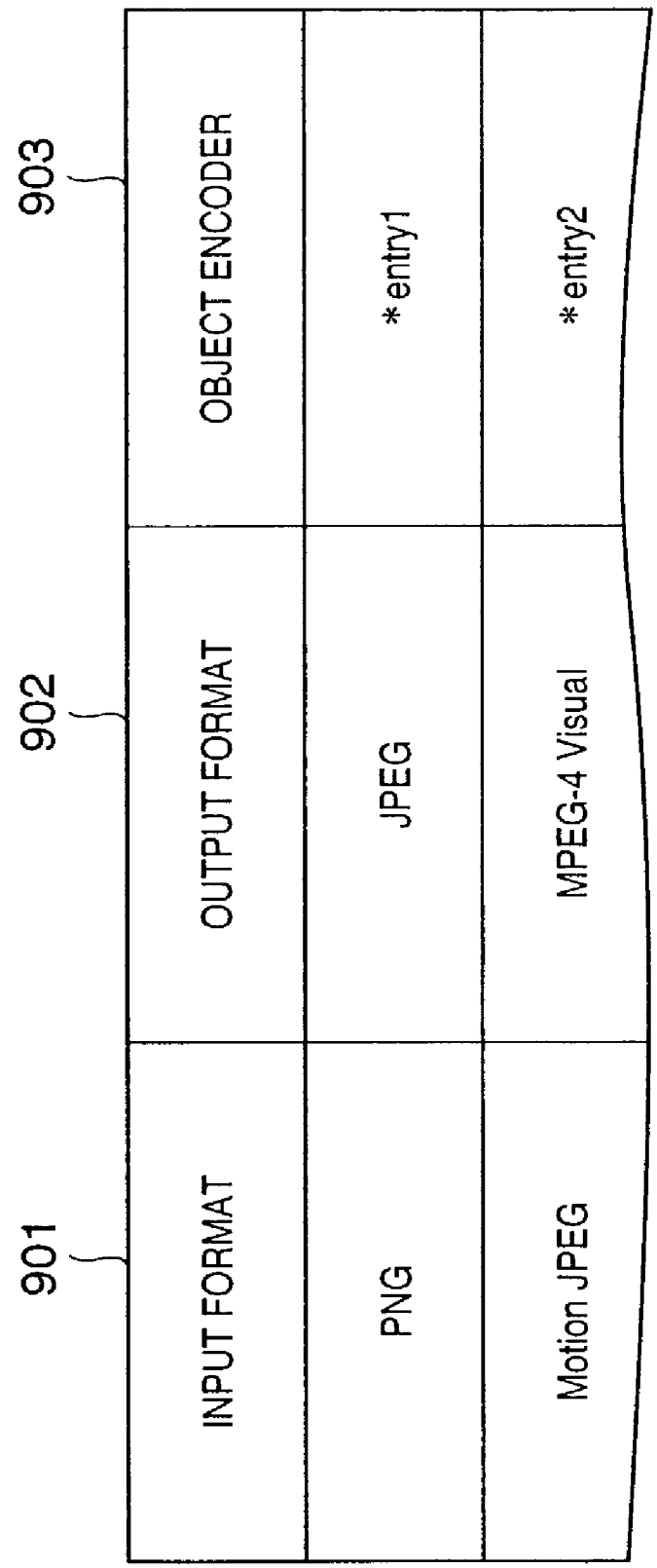
FIG. 9 shows an example of an object encoder decision table used to decide an object format.

To attain the aforementioned process, a function of checking the format of each individual input object, and determining a format into which that object must be converted is required to be added. FIG. 9 shows an example of an object encoder decision table used to decide the object format. Referring to FIG. 9, an input format 901 indicates the format of a corresponding input object, and can be designated using a MIME (Multipurpose Internet Mail Extension, RFC2045 to 2049) type or file format.

An output format 902 indicates a format that the object encoder 809 must output, and may be similarly designated by a MIME type or an arbitrary, unique format. An object encoder 903 designates a value, library name, and the like to be given to a function entry or a decision routine that calls a function of the object encoder. Using the object encoder decision table shown in FIG. 9, each individual object sent from the multimedia edit & playback terminal 201 to the multimedia edit server 202 can be converted into an optimal format.

Note that the object encoder decision table shown in FIG. 9 may contain additional information such as a processing parameter or the like and a format in object coding, i.e., StreamType or the like described above in case of MPEG-4. Also, if the output format 902 is uniquely determined in advance depending on an object encoder, the output format 902 may be omitted by a tacit agreement.

Furthermore, the input format 901 may be checked by interpreting each individual object sent from the multimedia edit & playback terminal 201 to the multimedia edit server 202. Alternatively, the multimedia edit & playback terminal 201 may send a value to the multimedia edit server 202 in advance.

Note that a file format and bitstream that store objects contain a data format unique to each individual object type, and a method of determining the object type by interpreting object data is generally made. Normally, the multimedia edit & playback terminal 201 that outputs objects recognizes the type of object to be output, and can easily inform that type upon outputting the object.

As described above, according to the present invention, since not only the already generated multimedia data but also individual objects are sent from the multimedia edit & playback terminal 201 to the multimedia edit server 202, and undergo object composition using a template, even a multimedia edit & playback terminal which does not have sufficiently high multimedia data generation performance can easily generate multimedia data. Also, the present invention can be applied to a case wherein multimedia data has already been sent to the multimedia edit server 202.

<Third Embodiment>

In the first and second embodiments, the multimedia data edit process is completed when the edit result of the multimedia edit server 202 is returned to the multimedia edit & playback terminal 201. If the multimedia edit & playback terminal 201 does not require any edit result, the load on the multimedia edit & playback terminal 201 may be further reduced.

For example, the user may make only edit operations and confirmation of an edit result on the multimedia edit & playback terminal 201 under the condition that another terminal having a faster communication line finally acquires the edit result.

Figure 10:
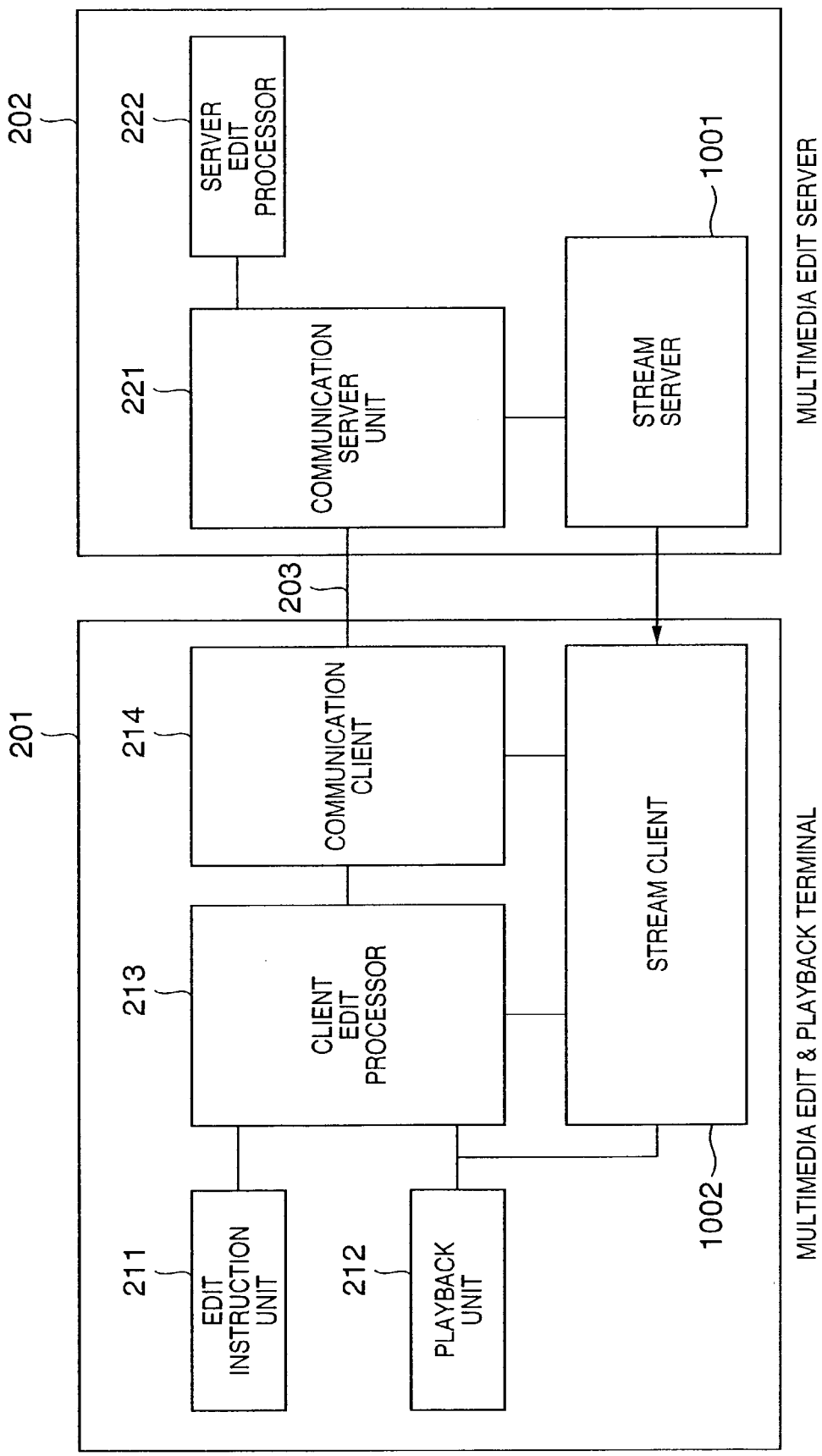
FIG. 10 is a block diagram showing the arrangement of a multimedia edit system according to the third embodiment.

FIG. 10 is a block diagram showing the arrangement of a multimedia edit system according to the third embodiment. As shown in FIG. 10, the third embodiment can be implemented by equipping a transmitter which mounts a stream server 1001 such as RTP (Realtime Streaming Protocol, RFC1889) as the transmitter 401 in the multimedia edit server 202. A stream client 1002 equipped in the terminal 201 provides a reception function corresponding to the stream server 1001.

In the transmission process (step S511) of the edit result in the flow chart shown in FIG. 5, it is not difficult to transmit multimedia data as the edit result using a stream server such as RTP or the like. Such stream server itself is prevalently used, and a feature of the present invention resides in application of such stream server and the like to the multimedia edit & playback terminal and multimedia edit server, and the multimedia edit system using them.

An example of an effect obtained upon implementing the multimedia edit system according to the present invention will be explained below. If the edit result is received as a file, the communication time becomes longer with increasing file size, thus imposing a heavier load on the multimedia edit & playback terminal 201. Hence, by streaming data, the user can view the edit result without any file transfer time although he or she can immediately receive the whole edit result.

An effect of such mechanism will be described in detail below. Assume that a given object is embedded in multimedia data serving as a template in advance in addition to an object which is set by the user, and the size of that object is 10 Mbytes. For example, if an object is a moving image, such object often has such size.

On the other hand, assume that an object to be edited set by the user is a 300-kbyte static image, and the user expects to edit a static image photographed by himself or herself as a multimedia object in combination with a moving image which is embedded in advance.

For example, if the communication performance of the multimedia edit & playback terminal 201 that the user possesses is as low as 64 kbps, the expected transmission time of the aforementioned object is around 40 sec, but the time required to acquire the edit result exceeds 20 min. Although the communication speed is becoming higher year by year along with the advance of technologies, such time difference is not preferable.

Hence, when a stream server is used to acquire the edit result, such acquisition time can be greatly reduced, and the limitation on a storage device required for the multimedia edit & playback terminal 201 is remarkably relaxed. That is, a quick edit process for the user is expected, and an edit process can be smoothly done on a portable terminal with limited processing performance.

Also, a method of playing back the edit result should be decided depending on user's advantages, i.e., whether the user requires the edited multimedia data itself on the multimedia edit & playback terminal 201 or requires to only confirm the edit result. Such decision can be implemented by providing choices on, e.g., an operation window of edit instructions or the like.

<Fourth Embodiment>

This embodiment will exemplify a process executed when the multimedia edit & playback terminal 201 has processing performance to such a degree that it can sequentially play back multimedia data along the time axis, and can extract encoded data at a significant frame position, but its performance is insufficient to execute a heavy-loaded edit process (e.g., conversion of moving image data into an oil-painting-touch image). Note that the multimedia edit & playback terminal 201 and the like in this embodiment use the apparatuses described in the first embodiment using FIGS. 2 to 4.

Figure 11:
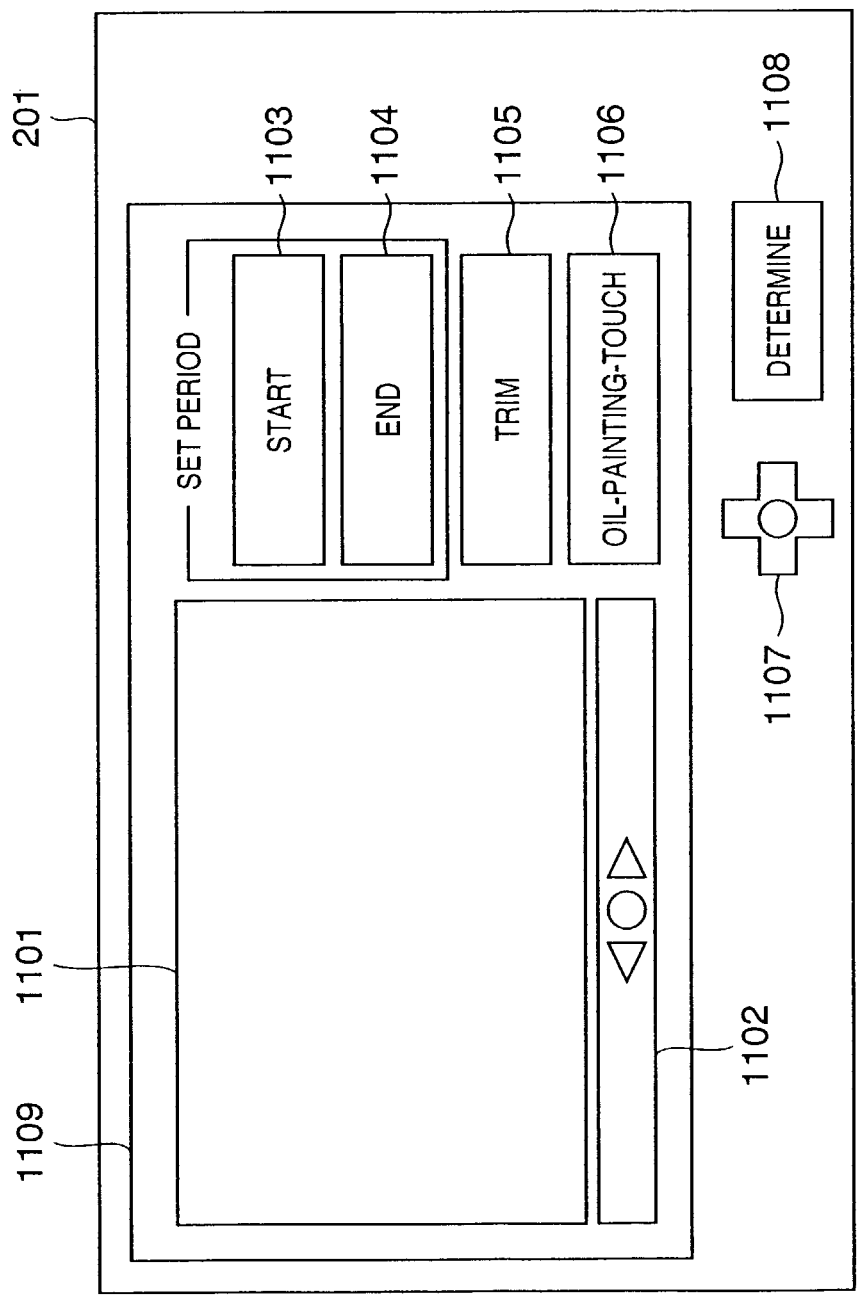
FIG. 11 shows an example of an edit window on a multimedia edit & playback terminal 201.

FIG. 11 shows an example of an edit window of the multimedia edit & playback terminal 201. That is, a display device 1109 is a display which corresponds to the display unit 305 in FIG. 3. As shown in FIG. 11, the display device 1109 has a display area 1101 of multimedia data to be edited, a slider button 1102 which represents the time axis, select buttons 1103 and 1104 used to issue a period setting instruction (start and end), a trim button 1105 used to trim a set period and to issue a trim instruction that designates only a moving image within that period, and an oil-painting-touch button 1106 used to issue an oil-painting-touch image instruction for converting a moving image into an oil-painting-touch image.

Furthermore, the display device 1109 has a cross-cursor key 1107 and determination button 1108, which correspond to the input/output operation unit 304 that provides these button operations to the user. For example, when the user wants to execute an edit process for trimming a part of multimedia data to be edited (1 min) so as to obtain multimedia data of about 10 sec, he or she operates the cross-cursor key 1107 and presses the start button 1103, which is used to set a period, at the start frame position. The user then presses the end button 1104 at the end frame position. After that, the user presses the button 1105 used to issue a trim instruction, thus trimming designated frames.

When the user wants to convert a part of multimedia data to be edited into an oil-painting-touch image, he or she can press the button 1106 used to issue an oil-painting-touch image instruction in place of the button 1105 used to issue a trim instruction.

Figure 12:
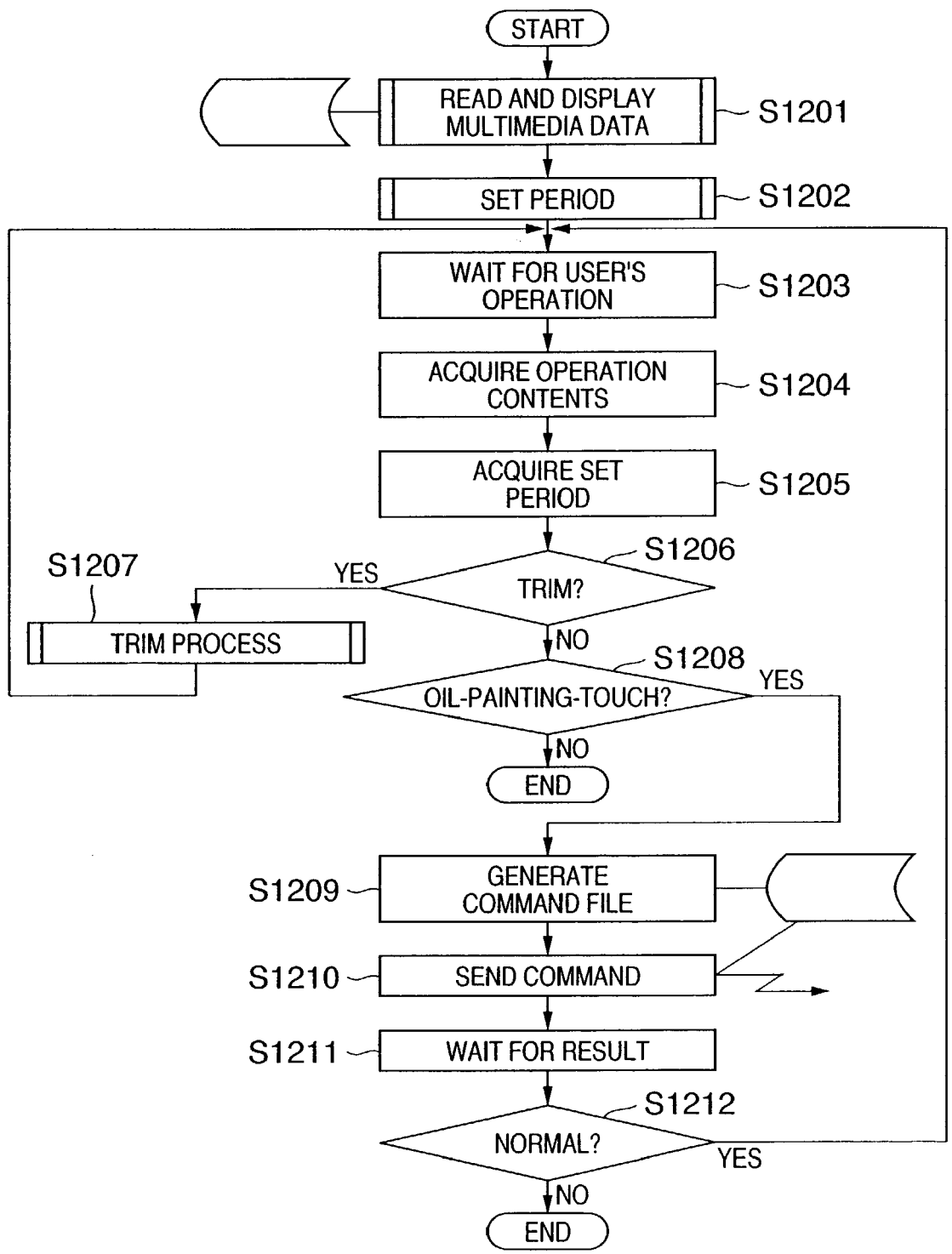
FIG. 12 is a flow chart showing the flow of the processing sequence of the multimedia edit & playback terminal 201 in the third embodiment.

The processing sequence will be explained below using this window example. FIG. 12 is a flow chart showing the flow of the processing sequence of the multimedia edit & playback terminal 201 in this embodiment. Assume that multimedia data to be edited is pre-stored in a recording medium connected to the external data input/output unit 309 in the multimedia edit & playback terminal 201, for the sake of simplicity.

The user operates the input/output operation unit 304 to read out multimedia data from the recording medium, thus displaying the multimedia data on the display device 1109 shown in FIG. 11 (step S1201).

The user sets a predetermined period of the readout multimedia data using the start and end buttons 1103 and 1104, which are used to set a period (step S1202). Assume that the period set by this operation normally reflects significant positions upon encoding in encoded data of the multimedia data. More specifically, encoding such as MPEG-4 or the like that can assure a high compression ratio adopts a complicated encoding algorithm (e.g., encoded data includes image frame data from which complete image data can be reconstructed, and differential frames which hold only differences before and after such image frame data) For this reason, when a differential frame is designated as the start position of a period to be set, or a middle position of frame data is designated, a heavy load is imposed on a data process, resulting in a complicated process.

As a method of searching for such significant frame positions, various methods (e.g., a method of designating a frame position using an index) may be adopted, but a description thereof will be omitted here. Also, assume that the trim process is implemented to allow a process on the multimedia edit & playback terminal 201, since the period to be processed is set using significant positions upon encoding and, hence, the load on a so-called decode process is small.

After the multimedia data is displayed on the display device 1109 and the period setting process is complete, the set period is stored in a storage device such as the memory 307 or the like. A program implemented according to the present invention waits for a user's operation instruction while it is ready to read out the set period (step S1203). If user's operation has been made at the input/output operation unit 304, the program acquires the operation contents (step S1204) and acquires only the set period (step 1205).

It is checked if the operation contents instruct a trim process (step S1206). If the operation instructs a trim process (YES), the calculation & control unit 306, coding processor 308, or the like executes the trim process (step S1207), and the trim result is displayed. After that, the flow returns to the standby state in step S1203.

Figure 13:
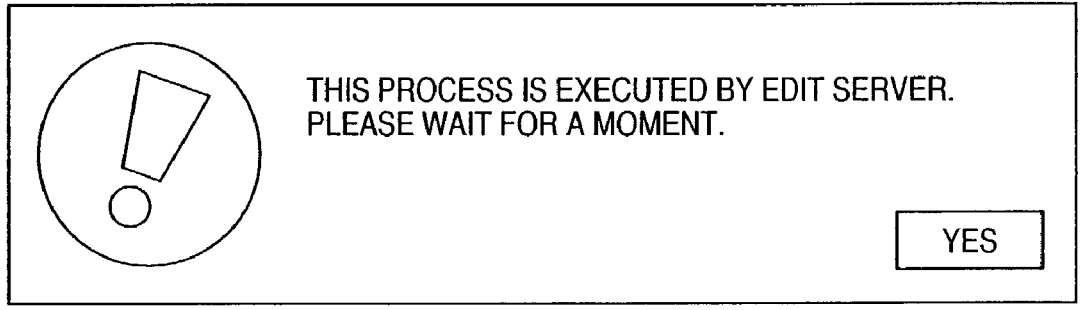
FIG. 13 shows an example of a message displayed on a display unit 305 of the multimedia edit & playback terminal 201.

On the other hand, if the operation contents do not instruct any trim process (NO), it is checked if the operation contents instruct oil-painting-touch conversion (step S1208). If the operation contents instruct oil-painting-touch conversion (YES), a command file containing the operation contents is generated (step S1209) The generated command file is sent to the multimedia edit server 202 (step S1210). Note that the command file designates data which gives an oil-painting-touch conversion instruction, and multimedia data to be converted. In some cases, it may take time until the result of the edit process requested to the multimedia edit server 202 is returned. To cope with such case, a message shown in FIG. 13 may be displayed. FIG. 13 shows an example of a message displayed on the display unit 305 of the multimedia edit & playback terminal 201.

After the command file is sent to the multimedia edit server 202, the program waits for the result returned from the multimedia edit server 202 (step S1211). It is then checked if the result returned from the multimedia edit server 202 is normal (step S1212). As a result, if the result is normal (YES), that result is displayed, and the flow returns to the standby state in step S1203. On the other hand, if the result is abnormal (NO), the process ends.

Although not described in the flow chart shown in FIG. 12, the multimedia edit & playback terminal 201 that has received the result from the multimedia edit server 202 can also execute playback & save processes of the edit result.

The command file will be explained below. The command file designates data which instructs edit contents of multimedia data, and multimedia data itself. As for this command file, data to be sent to the multimedia edit server 202 to instruct edit contents, i.e., data upon communication, is considered as a logical file, but a physical file is not always generated.

The command file contains at least three items. That is, the command file contains a command indicating the edit process contents of multimedia data, processing parameters required for that command, and multimedia data to be edited. The multimedia data need not always be data itself but may be a reference to multimedia data to be sent to the multimedia edit server 202 together with the command file. If the command that indicates the edit contents does not require any processing parameters, the processing parameters need not always be included.

Figure 14:
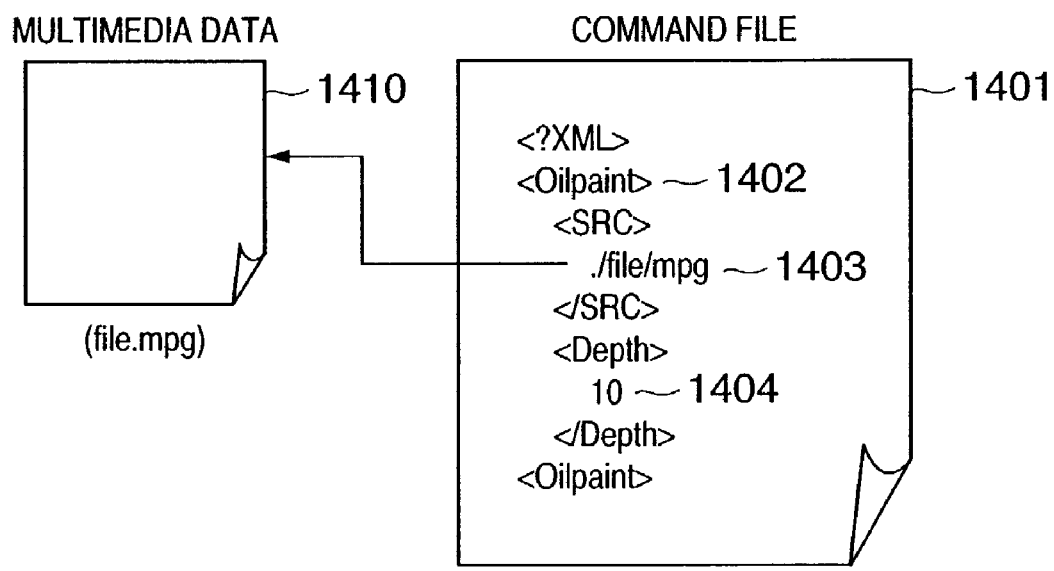
FIG. 14 shows an example of a command file used to edit multimedia data.

Details of a format used to describe such command file, and a communication protocol to be used are not the essence of the present invention. However, as a characteristic method of effecting the essence of the present invention, a description method using a structure description language is known. An example of a description using this structure description language will be explained below. FIG. 14 shows an example of a command file used to edit multimedia data. As shown in FIG. 14, a command file 1401 describes data in the structure description language. In this embodiment, the command file contains a command "Oilpaint" 1402 indicating the edit contents, a reference 1403 to multimedia data 1410, and an edit parameter 1404. In this example, the multimedia data is to be referred to, but may be embedded in this command file.

In this way, the edit process contents, multimedia data to be edited, and edit parameter can be clearly described using the structure description language. Even when an edit parameter to be designated varies depending on the edit contents, when the contents to be designated as an edit parameter vary while the edit contents remain the same, or when a plurality of edit parameters are required or structured, such parameter can be flexibly described. Of course, if no edit parameter is required, the parameter need not be present.

The structure description language can easily use protocols and processing applications for data exchange and can easily build a system according to the present invention, since a format which has already been standardized and is generally available such as XML (extensible Markup Language) is present. In an actual operation, a multimedia data size, user authentication data required for processing of an application, and the like may be contained as additional information in addition to the aforementioned information. Such additional information does not influence the essence of the present invention.

A description of the decision parts (steps S1206 and S1208) of the edit processes that have been explained in the flow of the process shown in the flow chart of FIG. 12 will be added. In the present invention, an edit process within the range of the processing performance of the multimedia edit & playback terminal 201 is executed by the multimedia edit & playback terminal 201 itself. As for an edit process beyond the range of the processing performance of the multimedia edit & playback terminal 201, an edit instruction is issued to the multimedia edit server 202 to fill up deficiency in processing performance. In this case, a decision for the processing performance must be made.

When an edit process is executed, whether or not that edit function is implemented is a self-evident condition upon determining the location of that process. If the multimedia edit & playback terminal 201 does not comprise a given edit function, it is obvious that the edit function is not available. However, the advance of technologies in recent years allows a so-called versatile processor to execute even a special image process, and it is possible to load a processing module that includes a new edit function from an external storage device or the like. In consideration of such circumstance, a processing condition table can be used to determine the location where the process is to be executed.

FIG. 15 is a view for explaining an example of the processing condition table. The table shown in FIG. 15 describes a command 1501 that indicates an actual edit process method, a processing location 1502 indicating the location of that process, and a processing condition 1503.

In the command 1501, a value indicating an edit process such as "Trim", "Oilpaint", or the like is set, and is used as a key when the program determines a user's operation instruction. In this embodiment, a character string is exemplified, but a message ID or the like expressed by a numerical value or the like may be used instead.

The processing location 1502 holds a value indicating a processing location when a process that matches the command 1501 is requested. The value may describe, e.g., an entry of a function, or a value to be passed to a conditional statement of a select routine that calls an entry of a function. When an edit process is executed on the multimedia edit server 202, that value may describe a call URL (Uniform Resource Locators, RFC1738) or a value to be passed to a conditional statement of a select routine that calls a function used to establish connection to the multimedia edit server 202.

The processing condition 1503 is selectively used, and holds a condition upon calling. If the process is delegated to the multimedia edit server 202 only when the degree of oil-painting-touch conversion process is large, the processing condition 1503 describes a value of a processing parameter that gives the degree of process, a condition, and the like. A field that gives the processing condition is not always required.

The processing condition may be determined based on an expected processing time required for an actual process. In such case, a time required for the process may be calculated using weight data calculated in advance on the basis of the size of data to be edited and the processing contents, and only when it is determined that a long processing time is required, the process may be delegated to the multimedia edit server 202. Alternatively, the processing condition may be determined based on whether or not the network 203 that makes a communication with the multimedia edit server 202 is ready, or the communication speed of the connected network 203.

With reference to such processing condition table, the decision parts (steps S1206 and S1208) of the edit processes in the flow chart shown in FIG. 5 can make more flexible processes. If this processing condition table is updated when a processing module which includes a new edit function is loaded from an external storage device or the like, as described above, the processing condition can be changed, so that the new processing function is executed on the multimedia edit & playback terminal 201.

As described above, an edit process within the range of the processing performance of the multimedia edit & playback terminal 201 is executed by the multimedia edit & playback terminal 201 itself with which the user actually edits data, and an edit process beyond the range of the performance, i.e., an edit process which is difficult to attain in terms of the processing performance of the user's terminal, can be done by issuing an edit instruction to the multimedia edit server 202, thus providing convenience to the user.

Furthermore, with the method that sends a command indicating the edit process contents, its parameter, and multimedia data to be edited together upon issuing an edit instruction to the multimedia edit server 202, a secondary effect, i.e., a simple processing sequence, can be expected. That is, since only required information is sent to the multimedia edit server 202 at a required timing, inconvenience in procedure for sending multimedia data to the multimedia edit server 202 in advance, difficulty in holding consistency between original multimedia data, and multimedia data, which is undergoing an edit process in the multimedia edit server 202, and the like can be eliminated compared to a case wherein the process is executed by only the multimedia edit server 202.

The processing condition table is effective to make a flexible decision and to improve feasibility upon determining whether the edit process is executed by the multimedia edit & playback terminal 201 or multimedia edit server 202, to update an application program, and so forth.

In addition to the edit process itself, if the user wants to apply both the trim and oil-painting-touch conversion functions described in this embodiment, the multimedia edit & playback terminal 201 may execute the trim process in advance. Therefore, the size of multimedia data to be sent via the network 203 can be smaller than that in a case wherein the multimedia edit server 202 uniquely executes both the trim and oil-painting-touch conversion processes, and the processing load on a portable terminal or the like, and the load on the bandwidth or the like of a communication environment can be reduced.

<Fifth Embodiment>

In the fourth embodiment, the edit process of relatively simple moving image data among multimedia data has been explained. The trim and oil-painting-touch conversion processes of moving image data may be replaced by audio trim and voice conversion processes (conversion of sound quality using a low-frequency filter or the like).

This embodiment will explain an application to object-based encoded multi-object data in place of such relatively simple example. For example, MPEG-4 can form one multimedia data by a plurality of objects. To these objects, data of various formats such as a moving image, static image, computer graphics (or vector graphics), text, audio, and the like can be applied, and these objects can be held together with layout information (to be referred to as "scene" hereinafter) of a tree structure.

When these objects are edited, the processing method and the processing load on an edit apparatus vary depending on objects. For example, when a moving image in objects which form multimedia data undergoes oil-painting touch conversion or a blur process of only an image surrounding portion, a heavy-load process for decoding a moving image, executing an image conversion process, and encoding the processed image again is required.

On the other hand, when a character string of text need only be changed from "landscape of Kyoto" to "landscape of Tokyo", even when text data has been converted into binary data, the processing load is very smaller than that on the aforementioned moving image conversion process. Again, when the position of an object described as a scene is corrected to move a moving image which is displayed on the upper right position on a frame to the lower left position, the processing load is similarly small.

In this embodiment, a case will be described in detail below wherein an edit process is executed in correspondence with such processing load for each object unique to object-based coding. FIG. 16 is a block diagram of a program that edits object-based encoded multimedia data.

As shown in FIG. 16, a program in this embodiment comprises an object split module 1602 for splitting multimedia data 1601 into objects, conversion modules 1604 for editing/converting each individual object data 1603 split by the object splitting module, an object composition module 1606 for compositing object data 1605 which have undergone the process of the conversion module again, an edit control module 1608 for managing multimedia data 1607 as an output edit result, and these modules and data, and the like.

A given conversion module 1604 executes an actual conversion process to an oil-painting-touch image, and the edit control module 1608 has a function of making the overall control. Note that modules which pertain to user's operations, a display function to the user, and the like are not shown in FIG. 16.

When the user wants to change a character string of text using the program shown in FIG. 16, the modules shown in FIG. 16 operate as follows. Initially, the object split module 1602 splits a text object from multimedia data 1601 in accordance with user's operation. If original multimedia data contains moving image and audio objects, moving image and audio objects are split to a minimum extent within a range consistent to object-based coding.

The conversion module 1604 converts a text character string in accordance with a user's instruction. Note that if this edit process falls within the performance range of the multimedia edit & playback terminal 201, as described in the fourth embodiment, it can be internally processed by the multimedia edit & playback terminal 201. More specifically, in this case, conversion is executed inside the conversion module 1604. Note that the processing location is determined, as has been explained in the fourth embodiment.

Upon completion of conversion, the split objects are composited again by the object composition module 906, thus ending the edit process. The above description has been given under the condition that the processing load upon changing a text character string is small, and such process can be sufficiently executed inside the multimedia edit & playback terminal 201.

A case will be explained below wherein an oil-painting-touch conversion process is executed for only a specific moving image object. Until the objects are split, and the given conversion module 604 executes an oil-painting-touch conversion process, the same procedure as in conversion of the text character string is taken. In this case, the processing location is selected, as has been described in the fourth embodiment. This selection may be made using the processing condition table shown in FIG. 15. If it is selected to execute an oil-painting-touch conversion process in the multimedia edit server 202, the conversion module 1604 does not execute any process by itself, entrusts to the edit control module 1608 sending of a command file to the multimedia edit server 202, and waits for the result.

Upon reception of data that has been converted by the multimedia edit server 202, the objects are composited by the object composition module 1606, thus ending the edit process. Note that multimedia data to be sent to the multimedia edit server 202 is only the split moving image object to be edited. In object-based coding, a plurality of moving image objects can be stored in one multimedia data. Since only one of these objects is sent to the multimedia edit server 202, the data size to be sent can be greatly reduced.

For example, when given multimedia data consists of two 500-kbyte moving image data, one 500 k-byte static image data, one 300-kbyte audio data, and 1-kbyte scene data, and one of the moving image objects is to be edited, only 500 kbytes of multimedia data of a total of 1801 kbytes need only be sent, and the data size to be sent is about 30% of the entire multimedia data.

In this manner, when the present invention is applied to object-based encoded multimedia data, a very large reduction of the processing load on communication can be expected depending on the edit contents and data to be edited. Furthermore, an edit process that must be done at the cost of image quality by reducing the data size of multimedia data to be edited in terms of a communication line and processing performance is more likely to be executed without dropping the image quality. Hence, a secondary effects can be expected in terms of the quality of multimedia data.

In the description of the above embodiment, whether the edit process is executed by the multimedia edit & playback terminal 201 or multimedia edit server 202 is decided by one conversion module 1604. In addition, this decision may be made by the edit control module 1608. Or this decision may be made by a module which controls a user interface.

In fact, the question about where this decision is made is a matter of implementation, and is not essential to the present invention, since various module configurations are available. Also, upon splitting objects, only an object to be edited need only be extracted if it is possible, and not all objects need be split.

In general, individual objects are managed in units called channels or elementary streams, and the split range varies depending on whether these objects are multiplexed and recorded or are separately recorded. If individual objects are recorded without being multiplexed, and the edit contents fall within the range that does not change the playback time of the multimedia data or the time stamp which specifies the processing timing, an object to be edited need only be split. These processes depend on the generation format of multimedia data to be edited and the like, and may be determined in correspondence to a system to which the present invention is applied.

As described above, whether an edit process for each object of object-based encoded multimedia data is executed by the multimedia edit & playback terminal 201 or multimedia edit server 202 is determined. In this manner, an edit process which can further reduce the processing load, and can avoid a problem of deterioration of image quality or the like as much as possible can be made.

<Other Embodiments>

The network and device arrangement that connect communication devices in the present invention are not limited to the Internet and mobile communication field. The present invention may be applied to various other networks such as so-called a home LAN, a wireless communication network with a limited communication distance called Bluetooth, and the like. Also, different multimedia edit servers 202 may be used depending on the edit processing contents or conditions in the processing condition table described using FIG. 15. More specifically, server A is used as the multimedia edit server 202 for an oil-painting-touch conversion process, and server B is used as the multimedia edit server 202 for a blur process.

For example, the present invention can be applied to a case wherein the multimedia edit server 202 also serves as a multimedia edit & playback terminal 201 (e.g., terminal B) which is different from the multimedia edit & playback terminal 201 (e.g., terminal A) which is used by the user. Also, when terminal B also serves the function of the multimedia edit server 202, and can execute an edit process that the terminal A cannot process, terminal B can act as the multimedia edit server 202.

More specifically, when terminal A is a compact portable terminal with very low performance, terminal B is a personal computer, and the multimedia edit server 202 is an apparatus which executes a special edit process by hardware and is connected to the Internet, a relatively simple edit process is executed by terminal A, an edit process with a relatively heavy load is executed by terminal B, and a special edit process that only the multimedia edit server 202 can do is executed by the multimedia edit server 202.

Furthermore, the present invention may be applied to either a system constituted by a plurality of devices (e.g., a host computer, interface device, reader, and the like), or an apparatus consisting of a single equipment (e.g., a portable phone).

The scope of the present invention includes a case wherein the functions of the embodiments are implemented by supplying a program code of software that implements the functions of the embodiments to a computer (or a CPU or MPU) in a system or apparatus, which is connected to various devices to make these devices implement the functions of the aforementioned embodiments, and making the computer of the system or apparatus control the devices in accordance with the stored program.

In this case, the program code itself of software implements the functions of the embodiments, and the program code itself, and means for supplying the program code to the computer (i.e., a storage medium which stores the program code) constitutes the present invention.

As the storage medium for storing such program code, for example, a floppy disk, hard disk, optical disk, magnetooptical disk, CD-ROM, magnetic tape, nonvolatile memory card, ROM, and the like may be used.

The program code is included in the embodiments of the present invention not only when the functions of the above embodiments are implemented by executing the supplied program code by the computer, but also when the functions of the embodiments are implemented by collaboration of the program and an OS (operating system) or another application software running on the computer. Furthermore, the present invention includes a case wherein the functions of the above embodiments are implemented by some or all of actual processing operations executed by a CPU or the like arranged in a function extension board or a function extension unit, which is inserted in or connected to the computer, after the supplied program code is written in a memory of the extension board or unit.

As described above, according to the present invention, even a multimedia edit & playback terminal with limited processing performance can easily execute an edit process that utilizes features of object-based coding, and can easily generate object-based encoded multimedia data in collaboration with a multimedia edit server. Also, it is easy to confirm the result of an edit process even for multimedia data with a relatively large size.

Also, according to the present invention, multimedia data to be edited can be sent to the multimedia edit server that can execute an edit process of the multimedia data to request it to edit the multimedia data via a communication and interactive process with the multimedia edit server. Since the terminal receives the multimedia data edited by the multimedia edit server, and plays back and saves that data, it can execute an edit process that can utilize features of object-based coding even when it has limited processing performance.

Furthermore, according to the present invention, edit layout information of multimedia data based on MPEG-4 (Moving Picture Expert Group Phase 4) that defines the contents of an edit process and a similar multimedia coding scheme having an object description function similar to MPEG-4, or a scheme simply called object-based coding can be stored. A plurality of pieces of edit layout information of multimedia data are sent as a list to the multimedia edit & playback terminal, multimedia data and an edit request sent from the multimedia edit & playback terminal are received, the edit/generation process of multimedia data is executed, and the result can be sent to the multimedia edit & playback terminal.

Moreover, according to the present invention, the edit result from the multimedia edit server can be easily confirmed on the multimedia edit & playback terminal with limited communication performance and processing performance by streaming that result.

In addition, according to the present invention, multimedia data can be edited in such a manner that the multimedia edit & playback terminal selects edit layout information of multimedia data provided by the multimedia edit server, and sends the selected edit layout information of multimedia data and multimedia data to be edited, or each individual multimedia data which can be converted into an individual object in object-based coding, and the multimedia edit server splits the received multimedia data into objects, determines the type of each object, applies the object to the layout information in accordance with the corresponding type, and composites the objects.

Also, according to the present invention, a multimedia edit system which is formed by connecting the multimedia edit & playback terminal and multimedia edit server via a network provides a mechanism that effectively implements the present invention, and the user can make a more flexible multimedia edit process with high expandability.

Furthermore, according to the above embodiments, even the multimedia edit & playback terminal with limited processing performance can easily execute a multimedia edit process beyond the limitations in collaboration with the multimedia edit server, and the user can make a more flexible multimedia edit process with high expandability.

The multimedia edit & playback terminal of the above embodiment can check an edit processing condition, i.e., whether or not a specific edit process designated by the user is difficult to achieve under given conditions such as limitations on processing performance and processing functions. At the same time, the terminal can determine the multimedia edit server which can execute such edit process. Hence, the terminal can execute the edit process of the multimedia data, which is difficult to achieve, by sending multimedia data, an edit instruction, and an edit parameter to the multimedia edit server which can execute the edit process, and receiving edited multimedia data as a result.

When multimedia data to be edited is encoded by object-based coding, the multimedia edit & playback terminal of the above embodiment can edit multimedia data with a smaller load by splitting an object to be edited from that multimedia data, making a decision for the edit process condition and sending multimedia data for each split object, receiving the object as an edit result of the edit server, and compositing the edited object with those which are not edited again.

The multimedia edit server of the above embodiment can provide a function required to smoothly execute an edit process, which is limited in the multimedia edit & playback terminal, by receiving multimedia data sent from the multimedia edit & playback terminal, executing the edit process, and sending multimedia data as an edit result to the multimedia edit & playback terminal which requested the process.

The multimedia edit method of the above embodiment is characterized by referring to a processing condition table to decide an edit processing condition, and determining a location, where the process is done, on the basis of an instruction indicating the edit contents and edit condition or a value indicating one of them. Furthermore, the processing condition table is characterized by updating the processing conditions when it is updated, and comprises a condition decision method which is implemented by describing an entry of a function indicating the processing location, a URL indicating the processing location of a server, or a value to be given to a select routine used to call a function which provides such processing function. Hence, the multimedia edit & playback terminal and multimedia edit server can be updated flexibly.

The multimedia edit system as a combination of the multimedia edit & playback terminal, multimedia edit server, and multimedia edit method of the above embodiment can execute a multi-functional edit process while minimizing the processing load and the like on the multimedia edit & playback terminal.

As described above, according to the present invention, even a portable terminal with limited processing performance can easily make a data edit process that fully utilizes features of object-based coding, and generate object-based encoded multimedia data by connecting to a server that can edit multimedia data, and sending an edit instruction to that server.

As described above, according to the present invention, even a multimedia edit & playback terminal having many limitations can edit multimedia data beyond such limitations in collaboration with a multimedia edit server, and can implement a more flexible multimedia edit process with high expandability with a minimum load.

The present invention is not limited to the above embodiments and various changes and modifications can be made within the spirit and scope of the present inventions. Therefore, to apprise the public of the scope of the present invention, the following claims are made.

What is claimed is:

1. A data processing server which can be connected, via a network, to a data processing apparatus that generates multimedia data described by object-based coding, comprising:
    a storage unit configured to store a plurality of templates, each template in the plurality of templates being capable of including a different number of objects from at least one other template in the plurality of templates;
    a first reception unit configured to receive the multimedia data from the data processing apparatus;
    a splitting unit that splits a number of objects from the multimedia data;
    a presenting unit that presents templates from the plurality of templates that have a number of object nodes matching the number of objects split from the multimedia data by said splitting unit, but does not present templates from the plurality of templates that have a different number of object nodes than the number of objects split from the multimedia data by said splitting unit;
    a transmission unit configured to transmit the templates determined by said presenting unit to the data processing apparatus;
    a second reception unit configured to receive information indicating a template designated by the data processing apparatus; and
    a generation unit configured to generate new multimedia data using the objects split from the multimedia data received by said first reception unit and the template specified by the information.

2. A method of controlling a data processing server which can be connected, via a network, to a data processing apparatus that generates multimedia data described by object-based coding, comprising:
    a storage step of storing a plurality of templates, each template in the plurality of templates being capable of including a different number of objects from at least one other template in the plurality of templates;
    a transmission step of transmitting the templates to the data processing apparatus;
    a reception step of receiving multimedia data;
    a splitting step of splitting the multimedia data received in the reception step into a number of objects from the multimedia data; and
    a presenting step of presenting templates from the plurality of templates that have a number of object nodes matching the number of objects split from the multimedia data in the splitting step, but not presenting templates from the plurality of templates that have a different number of object nodes than the number of objects split from the multimedia data in the splitting step,
    wherein said reception step receives from the data processing apparatus the multimedia data, said transmission step transmits, to the data processing apparatus, templates determined in the presenting step from the plurality of templates stored in said storage step, and said reception step receives the information indicating templates of edit processes from the data processing apparatus.

3. A computer readable medium having encoded thereon a computer program for controlling a data processing server which can be connected, via a network, to a data processing apparatus that generates multimedia data described by object-based coding, comprising:
    a code of a storage step of storing a plurality of templates, each template in the plurality of templates being capable of including a different number of objects from at least one other template in the plurality of templates;
    a code of a transmission step for transmitting the templates to the data processing apparatus;
    a code of a reception step of receiving multimedia data;
    a code of a splitting step of splitting the multimedia data received in the reception step into a number of objects from the multimedia data; and
    a code of a presenting step of presenting templates from the plurality of templates that have a number of object nodes matching the number of objects split from the multimedia data in the splitting step, but not presenting templates from the plurality of templates that have a different number of object nodes than the number of objects split from the multimedia data in the splitting step,
    wherein said reception step receives from the data processing apparatus the multimedia data, said transmission step transmits, to the data processing apparatus, templates determined in the presenting step from the plurality of templates stored in said storage step, and said reception step receives the information indicating templates of edit processes from the data processing apparatus.

* * * * *